United States Patent
Nguyen

(10) Patent No.: US 10,085,143 B2
(45) Date of Patent: Sep. 25, 2018

(54) SYSTEM FOR MANAGING ORGANIZATIONAL EMERGENCIES AND COORDINATING EMERGENCY RESPONSES

(71) Applicant: QNEXIS, INC., Reston, VA (US)

(72) Inventor: Kurt Nguyen, Leesburg, VA (US)

(73) Assignee: QNEXIS INC., Reston, VA (US)

( * ) Notice: Subject to any disclaimer, the term of this patent is extended or adjusted under 35 U.S.C. 154(b) by 0 days.

(21) Appl. No.: 15/720,601

(22) Filed: Sep. 29, 2017

(65) Prior Publication Data

US 2018/0098206 A1    Apr. 5, 2018

Related U.S. Application Data

(60) Provisional application No. 62/402,258, filed on Sep. 30, 2016.

(51) Int. Cl.
| | |
|---|---|
| *H04L 12/58* | (2006.01) |
| *H04W 4/90* | (2018.01) |
| *H04W 4/22* | (2009.01) |

(52) U.S. Cl.
CPC ............ *H04W 4/90* (2018.02); *H04L 51/12* (2013.01); *H04L 51/20* (2013.01); *H04L 51/32* (2013.01); *H04W 4/22* (2013.01)

(58) Field of Classification Search
CPC ........... H04W 4/90; H04W 4/06; H04W 4/02; H04W 92/18; H04W 48/10; H04W 64/00
See application file for complete search history.

(56) References Cited

U.S. PATENT DOCUMENTS

| | | | |
|---|---|---|---|
| 9,541,407 B1* | 1/2017 | Mohler | H04W 4/90 |
| 2005/0131740 A1* | 6/2005 | Massenzio | G01C 21/3415 |
| | | | 705/2 |
| 2013/0157609 A1* | 6/2013 | Vainik | G06F 11/0781 |
| | | | 455/404.1 |
| 2013/0203373 A1* | 8/2013 | Edge | H04W 4/90 |
| | | | 455/404.2 |
| 2014/0002241 A1* | 1/2014 | Elghazzawi | H04W 4/023 |
| | | | 340/8.1 |
| 2014/0368601 A1* | 12/2014 | deCharms | H04W 4/021 |
| | | | 348/14.02 |
| 2015/0317809 A1* | 11/2015 | Chellappan, Sr. | H04W 4/90 |
| | | | 455/404.1 |
| 2017/0019777 A1* | 1/2017 | Cole, Jr. | H04W 4/22 |
| 2017/0153790 A1* | 6/2017 | Mohanam | H04W 4/90 |

\* cited by examiner

*Primary Examiner* — Dung Hong
(74) *Attorney, Agent, or Firm* — Symbus Law Group, LLC; Clifford D. Hyra

(57) ABSTRACT

An emergency response system includes remote computing devices programmed via executable code instructions to broadcast an emergency alert to recipients, responsive to instructions received from administrators or emergency responders, the emergency alert including a response request permitting recipients to provide a binary positive or negative user status response, receive the responses from the recipients along with location information, send a map showing known recipient locations coded by corresponding response status to the administrators/responders, provide chat functionality between users during an emergency alert, provide social media functions including message exchange between users, and override the social media functions during an emergency alert so that social media messages cannot be exchanged.

18 Claims, 24 Drawing Sheets

FIG. 17

| Alert Title | Last Modified | Created By | Status | Edit | Delete |
|---|---|---|---|---|---|
| Fire Alert | December 29, 2016 12:35 PM | Kurt Nguyen | Active | | |
| Shooting Alert | December 23, 2015 01:09 PM | Zain Hatim | Dismissed | | |

Create Alert — 1702
1704

Fire Alert (1708)

1706

| Alert Post | Last Modified | Created By |
|---|---|---|
| Meet on south side | December 29, 2016 12:35 PM | Kurt Nguyen |
| Evacuate the building | December 29, 2016 12:20 PM | Zain Hatim |
| Shooter on base | December 29, 2016 12:00 PM | Kurt Nguyen |

1710 — Send Update

User Status

| All | OK | Not OK | Pending |
|---|---|---|---|

| Name | Email | Phone Number | Status |
|---|---|---|---|
| asfa asfasf | testt@test.com | 1234567891 | Pending |
| Jane Doe | test@tester1.com | 1234567891 | OK |
| John Doe | test@test.com | 4437437114 | Not OK |
| Lewis Griffin | img3rd@gmail.com | 7033221240 | Pending |
| tester testing | tes@test.com | 1234567891 | Pending |
| tester testing | testt@test.com | 1234567891 | Pending |
| asfa asfasf | testt@test.com | 1234567891 | Pending |

1712

Dismiss Alert — 1714

FIG. 22

SYSTEM FOR MANAGING ORGANIZATIONAL EMERGENCIES AND COORDINATING EMERGENCY RESPONSES

This application claims the benefit of U.S. Provisional Application No. 62/402,258, filed Sep. 30, 2016, which is hereby incorporated by reference in its entirety.

FIELD OF THE DISCLOSURE

This disclosure relates generally to emergency response/management.

BACKGROUND

Existing systems for managing and responding to emergencies and other extraordinary events suffer from a variety of problems, including disengaged users who fail to use or install an application and therefore do not receive emergency alerts when sent and an inability to locate and communicate with those involved in the emergency.

Needs exist for improved systems and methods for managing and responding to emergencies.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

An implementation of the present invention may be an enterprise mobile app that allows organizations to collaborate, create social media communities, and provide emergency communications, leveraging communication platforms such as email, websites, social media, and digital signage, and integrating them in one powerful app for each organization's unique needs. Email blasts often go unread or end up in the spam box. Finding content on websites is difficult and time-consuming. Social media/networking platforms are unstructured and not suitable for organizations wishing to keep information within their group. And digital signage systems require users to be in front of the screen to view content.

Organizations need a simple way to connect people, communicate relevant content to users, and leverage the power of mobility and social media to collaborate within their community. A flexible and simple mobile app achieves these goals and benefits a wide variety of organizations. For example, government agencies and businesses can deliver rich media content, including official news and announcements to their distributed workforce. The app can provide mobile training or enable teams to communicate and collaborate around mission-critical processes.

Universities and K-12 schools can keep faculty, students and parents informed of news, alerts, and information. The app can be used to create social media groups designed for school, student or parent initiatives, promoting awareness and building community support.

Non-profits and associations can add value to members by creating social media groups tailored to their brand, mission, or interest.

In an emergency, first responders need the ability to communicate what is happening and account for people quickly. The app features a mass emergency notification and accountability system that gives administrators/first responders the ability to alert people via the app about emergency conditions such as inclement weather, fire, public safety hazards or threats.

From their computer or smartphone, first responders can send multi-mode mass communication alerts via text, email, and push notifications to users to let them know what is happening and provide instructions about what to do. The app also lets administrators/first responders account for people via the app by requesting user status. Users simply check "ok" or "not ok." A dashboard presentation gives first responders the ability to assess users who have checked "ok", "not ok" or who have not responded. Using GPS within the app, first responders can view and locate users who checked "not ok" or who have not responded, and then contact them directly via email, phone or chat to send or provide aid. In addition to checking "ok" or "not ok" users may also communicate directly with responders by text, email, chat, or app push if they are able.

An implementation of the invention is a communication system and a method for managing an extraordinary event. In the context of an organization with a small to large number of members, the communication system includes a server in wireless communication with a number of user devices, each of which is associated with a member of the organization. Exemplary devices can include smart phones, desktops, tablets, and other handheld devices. During an extraordinary event, the organization can, via the server, mass communicate with the members via the devices. For example, the organization can broadcast to the devices an emergency message, along with an inquiry. The members, via their devices, can then provide a feedback to the inquiry. Based on the feedbacks received from the members, the organization learns about the status or location of the members, and can then take specific action with respect to specific members.

In a specific implementation or embodiment of the invention, employees of a government agency may be equipped with wireless devices. The devices may contain a mobile app that is in communication with a server administered by the agency. In an emergency, such as a fire or an electrical outage at a particular section of a building where the agency is located, the server may send out an emergency message to the employees, giving them the latest information. The message can include an inquiry (e.g., "Are you ok?"). Further, individual employees can respond via the mobile app (e.g., tapping graphical user interface elements labeled "ok" or "Not ok"). After collecting the responses, the server can provide statistical data to an administrator to take follow up action. For example, the server can identify one or more employees who are still in the building. The server and/or an admin user may create a chart or other visualization showing certain information such as responses of users in certain locations and send the chart to first responders through the app or by email, etc.

Additionally, the server may provide the administrator with various functionalities for sending additional information or instructions to devices associated with the one or more employees who are still in the building. In some examples, the server can identify one or more employees that have not responded to the inquiry, and communicate with other employees to determine the status and/or location of the one or more employees that have not responded to the inquiry.

Additional aspects of the invention include social media messaging and an override feature. The override feature, in one embodiment, overrides the social media and/or other features of the mobile app during an extraordinary event. During the override, the server may send an inquiry to client devices, along with an instruction to display the emergency notification on the user devices, regardless of the status of the device. Additionally, the override feature may restore the conventional social media and/or other features of the mobile app once the extraordinary event is closed.

In some embodiments, the override feature can utilize special notifications to solicit feedback from the users. For example, the server may cause user devices to play special ringtones or sounds, display graphical elements, vibrate, or otherwise indicate to the users the extraordinary nature of the message and inquiry.

In some implementations, social media functions may be integrated into the application, allowing members to communicate with each other regarding non-emergency matters (for example, pertaining to the organization) and ensuring that members install and maintain the app and are familiar with it and its functionality, to maximize the number of members who receive an emergency message when one is sent. Social media/networking posts/communications may be threaded and date and time stamped. The social media environment may be restricted to the members of the organization and may be used by the organization to push non-emergency information to members, such as job postings, corporate announcements, with pictures and video, and to allow (or not allow) members to comment on and share the information, making for two-way communications that is more engaging to members and makes them more likely to use the app. The social media/networking allows members to raise organization-specific concerns internally, and to report suspicious activity or other problems to raise awareness within the organization and prompt action and crowd-source feedback and responses to assess the seriousness of a threat, receive assistance, etc. For example, the app may serve as an ever-present replacement for campus "blue phones" for reporting trouble. The organization may also use the social media/networking functions to periodically push and collaborate on training pieces, e.g. emergency preparedness, organization emergency policy, etc., so that users obtain and maintain a familiarity with and knowledge of this information.

A new emergency response system includes a first set of one or more computing devices programmed, via executable code instructions, to: broadcast a first emergency alert to a second set of one or more recipient computing devices, responsive to instructions received from one or more of a third set of administrative or responder computing devices, the first emergency alert comprising information relating to an emergency and a response request, the response request permitting a user of each of the second set of one or more recipient computing devices to provide a binary positive or negative user status response, to receive binary positive or negative user status responses from the second set of recipient computing devices, and/or location information corresponding to each of the second set of recipient computing devices, to send a map showing known recipient computing device locations for the second set of recipient computing devices, coded by corresponding response status of positive, negative, or no response received, to the third set of administrative or responder computing devices, to broadcast a second emergency alert to each of a fourth set of one or more relationship computing devices, the second emergency alert comprising the information relating to the emergency and information pertaining to an associated user of one or more of the second set of one or ore recipient computing devices including the associated user's status response or lack thereof, location information, and/or contact information, to send follow-up communications and/or queries to users of the second set of one or more recipient computing devices from which no status response and/or negative status responses were received, to utilize the received location information to identify positive status users of the second set of one or more recipient devices from which positive status responses were received who are located closest to users of the second set of one or more recipient computing devices from which no status response and/or negative status responses were received and querying them as to the status and/or location of the users of the second set of one or more recipient computing devices from which no status response and/or negative status responses were received, to send and receive social media messages between the recipient computing devices and override the exchange of social media messages to broadcast the first emergency alert regardless of how the recipient computing devices are currently being utilized, and to restore normal sending and receiving of social media messages only when an indication is broadcast that the emergency is over, to receive chat messages from the recipient computing devices, the administrator or responder computing devices, and/or the relationship computing devices and broadcast the chat messages to the recipient computing devices, the administrator or responder computing devices, and/or the relationship computing devices while the exchange of social media messages is overridden, and to link two or more users of the recipient computing devices, the administrator or responder computing devices, and/or the relationship computing devices, such that the linked users have shared access to social media messages associated with given topics. Sending and receiving social media messages may include receiving messages from the recipient computing devices and broadcasting the messages to the recipient computing devices, the administrator or responder computing devices, and/or the relationship computing devices, and receiving responses from the recipient computing devices, the administrator or responder computing devices, and/or the relationship computing devices to the messages and broadcasting the responses to the recipient computing devices, the administrator or responder computing devices, and/or the relationship computing devices.

The system may also include the second set of one or more recipient computing devices, and each of the one or more recipient computing devices of the second set may be programmed, via executable code instructions, to receive the first emergency alert display the response request, responsive to receiving the first emergency alert, such that the user thereof can provide a binary positive or negative user status response by a single actuation, and to transmit location information for the respective computing device and any user status response.

The computing devices may be further programmed, via executable code instructions, to provide summary statistics including number of recipient computing devices located within a given predetermined geographical area and/or number of recipient computing devices located within the given predetermined geographical area that have associated a negative user status response or no user status response. The predetermined geographical area may include a building, a property, a campus, an area including a building, property, and/or campus and a certain surrounding area, and/or a given predetermined radius around a point.

The computing devices may be further programmed, via executable code instructions, to broadcast additional information pertaining to the first emergency alert to the second set of one or more recipient computing devices.

The computing devices may be further programmed, via executable code instructions, to receive updates to the binary positive or negative user status responses from the second set of recipient computing devices, and/or updates to the location information corresponding to each of the second set of recipient computing devices, and to update the displayed map accordingly.

The computing devices may be further programmed, via executable code instructions, to receive a selected subset of the second set of one or more recipient computing devices from a user of one of the third set of one or more administrator or responder computing devices and to query the subset as to the status and/or location of one or more of the users of the second set of one or more recipient computing devices from which no status response and/or negative status responses were received.

The computing devices may be further programmed, via executable code instructions, to receive one or more selected modes of transmission from a user of one of the third set of one or more administrator or responder computing devices and to broadcast the first and/or second emergency alert in the selected modes, the selected modes comprising one or more of email, SMS, and push notification.

The administrator or responder computing devices may be further programmed, via executable code instructions, to receive an instruction to suppress the response request from a user of one of the third set of one or more administrator or responder computing devices and to broadcast a third emergency alert to the second set of one or more recipient computing devices, the third emergency alert including information relating to a second emergency and not including a response request.

The recipient computing devices may be further programmed, via executable code instructions, to vibrate, play a special ringtone or sound, and/or display graphical elements when the first emergency alert is broadcast and/or the exchange of social media messages is overridden, to indicate an extraordinary nature of the first emergency alert.

The summary statistics may include number and/or percentage of number of recipient computing devices from which a response has been received and a list of recipient computing devices from which a response has not been received, and the administrative or responder computing devices may be further programmed, via executable code instructions, to receive a selection of one or more recipient computing devices from the list and display further information regarding the selected one or more recipient computing devices and/or their users and to initiate an email, chat message, or phone call to the selected one or more recipient computing devices and/or their users.

The system may also include an organizational data repository containing identity information regarding members of an organization, and the computing devices may be further programmed, via executable code instructions, to receive requests from unregistered computing devices to register as recipient computing devices associated with recipient users, the requests including associated identity information, and to check the identity information associated with the requests against the identity information in the organizational data repository regarding the members of the organization, and to approve the requests where a match is found.

The computing devices may be further programmed, via executable code instructions, to receive a non-emergency message from one of the administrative or responder computing devices and broadcast it to the recipient computing devices by email, SMS, and/or application push notification.

The computing devices may be further programmed, via executable code instructions, to receive requests to associate new relationship computing devices with the recipient computing devices, and to carry out or deny the received requests.

The system may also include the third set of one or more administrative or responder computing devices, and each of the one or more administrative or responder computing devices of the third set may be programmed, via executable code instructions, to retrieve and display a directory of the second set of recipient computing devices and/or their users, to sort the directory by user status response, to display information for individual computing devices and/or users from the directory based on selections received from a user thereof, and to create temporary subsets of the second set of recipient computing devices based on received selections and transmit communications to all members of the temporary subsets simultaneously.

The computing devices may be further programmed, via executable code instructions, responsive to requests from the third set of administrative or responder computing devices, to transmit contact information corresponding to selected recipient computing devices to the requesting administrative or responder computing devices.

The computing devices may be further programmed, via executable code instructions, to track content of messages passing between recipient computing devices and to determine the types of content that are most frequently exchanged.

A non-transitory computer storage has new instructions for causing a first set of one or more computing devices to determine, triage, follow-up and assist organizational members in an emergency by: broadcasting a first emergency alert to a second set of one or more recipient computing devices, responsive to instructions received from one or more of a third set of administrative or responder computing devices, the first emergency alert including information relating to an emergency and a response request, the response request permitting a user of each of the second set of one or more recipient computing devices to provide a binary positive or negative user status response, receiving binary positive or negative user status responses from the second set of recipient computing devices, and/or location information corresponding to each of the second set of recipient computing devices, displaying a map showing known recipient computing device locations for the second set of recipient computing devices, coded by corresponding response status of positive, negative, or no response received, on the third set of administrative or responder computing devices, broadcasting a second emergency alert to each of a fourth set of one or more relationship computing devices, the second emergency alert including the information relating to the emergency and information pertaining to an associated user of one or more of the second set of one or more recipient computing devices including the associated user's status response or lack thereof, location information, and/or contact information, sending follow-up communications and/or queries to users of the second set of one or more recipient computing devices from which no status response and/or negative status responses were received, and utilizing the received location information to identify positive status users of the second set of one or more recipient devices from which positive status responses were received who are located closest to users of the second set of one or more recipient computing devices from which no status response and/or negative status responses were received and querying them as to the status and/or location of the users of the second set of one or more recipient computing devices from which no status response and/or negative status responses were received.

These and further and other objects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIG. 17 shows a create alert web page of an organizational emergency management web application, in accordance with one or more implementations of the present invention.

FIG. 22 shows a view mobile users web page of an organizational emergency management web application, in accordance with one or more implementations of the present invention.

DETAILED DESCRIPTION

Figure 1:
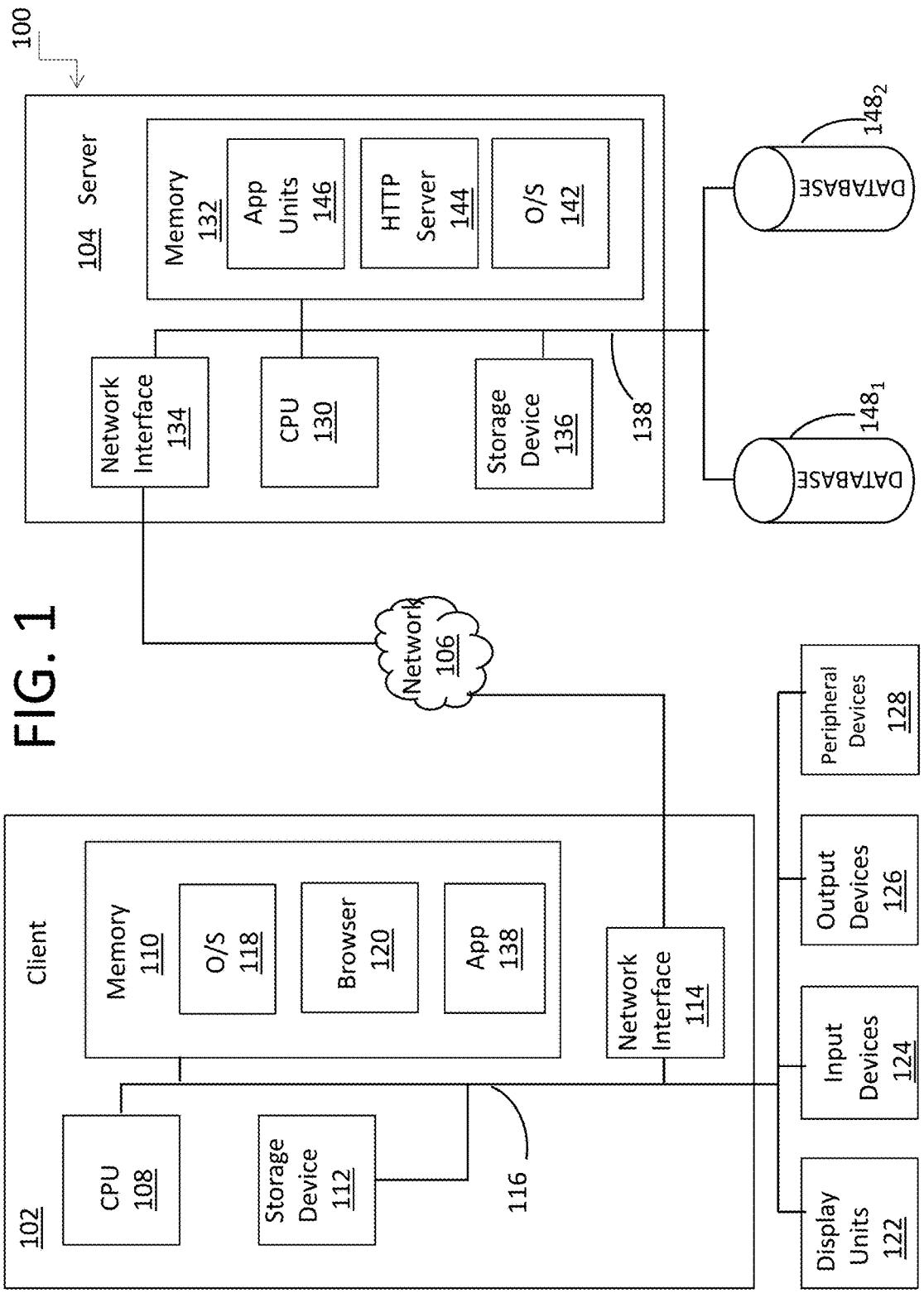
FIG. 1 is a block diagram illustrating an exemplary computing environment 100, in accordance with one or more implementations of the present invention.

A system for managing organizational emergencies and coordinating emergency responses will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In general, the word "instructions," as used herein, refers to logic embodied in hardware or firmware, or to a collection of software units, possibly having entry and exit points, written in a programming language, such as, but not limited to, SWIFT, Objective C, Java, Lua, C, C++, or C#. A software unit may be compiled and linked into an executable program, installed in a dynamic link library, or may be written in an interpreted programming language such as, but not limited to, BASIC, Perl, or Python. It will be appreciated that software units may be callable from other units or from themselves, and/or may be invoked in response to detected events or interrupts. Software units configured for execution on computing devices by their hardware processor(s) may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. Generally, the instructions described herein refer to logical modules that may be combined with other modules or divided into sub-modules despite their physical organization or storage.

In this disclosure, references are made to users (recipients, relationship users, administrators and responders) and to their client computing devices/platforms. In general, the users and their computing devices are conceptually interchangeable—a message from a user is sent by the user, using the user's computing device, and the message may be considered to have been sent by the computing device, by the user, or both. Similarly, a user's location may be considered the same as the location of their computing device, since a user operating their computing device will be in the same location as the computing device. In some instances, the computing device carries out some action without any input from the user, such as displaying a message, however for the sake of convenience this action may be attributed to the user (e.g. in FIGS. 3-9) as the computing device is serving as the user's proxy. Some actions may be automated to a greater or lesser extent, according to algorithms and/or preset user preferences, such as responding to a chat message (e.g. there may be an automated "do not disturb" or "away" message returned). Therefore, it is to be understood that where an action is shown or described as being performed by a user, in various implementations and/or circumstances the action may be performed entirely by the user's computing device or by the user, using their computing device to a greater or lesser extent (e.g. a user may type out a response, or may choose form preselected responses generated by the computing device). Similarly where an action is shown or described as being carried out by a computing device, the action may be performed autonomously by that computing device or with more or less user input, in various circumstances and implementations.

FIG. 1 is a block diagram illustrating an exemplary computing environment 100, in accordance with one or more implementations of the present invention. One embodiment of the invention is implemented as a program product for use with a computer system such as, for example, the computing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive, solid state storage devices); and (iii) information conveyed to a computer by a communications medium, such as through a computer or telephone network, including wireless communications.

The latter embodiment specifically includes information downloaded from the Internet and/or other networks. Such signal-bearing media, when carrying computer-readable instructions that direct the functions of the present invention, represent embodiments of the present invention. In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices.

In addition, various programs described hereinafter may be identified based upon the application for which they are implemented in one or more specific embodiments of the invention. However, it should be appreciated that any particular program nomenclature that follows is used merely for convenience, and thus the invention should not be limited to use solely in any specific application identified and/or implied by such nomenclature. In this regard, references to particular definitional languages, such as HTML and XML, are illustrative in nature and do not serve to limit the claims. It is broadly contemplated that the invention is applicable regardless of the particular schema and/or language used to define network resource content.

Turning now to FIG. 1, a block diagram illustrating an exemplary computing environment 100, in accordance with an embodiment of the present invention, is shown. In general, the computing environment 100 includes a client (e.g., a user's) computing device 102, and a server computer 104. The client computer 102 and the server computer 104 may be components of the same computer system or may be connected via a network 106, such as the Internet.

As shown, the client computer 102 includes a central processing unit (CPU) 108 connected to a memory 110, a storage device 112, and a network interface 114 via a bus 116. The CPU 108 is included to be representative of a single CPU, multiple CPUs, a single CPU having multiple processing cores, and the like. The storage device 112 stores application programs and data for use by the client computer 102. Examples of the storage device 112 include one or more hard-disk drives, flash memory devices, optical media and the like.

The client computer 102 may be connected to the data communications network 106 (e.g., a local area network, which itself may be connected to other networks such as the internet) using the network interface 114. The memory 110 can be one or a combination of memory devices, including random access memory, nonvolatile or backup memory (e.g., programmable or flash memories, read-only memories, etc.). Illustratively, the memory 110 of client computer 102 stores an operating system 118 used to manage hardware and software executing on the client computer 102. As shown, memory 110 also includes a browser program 120 which, when executed by CPU 108, provides support for navigating between various servers and locating network addresses at one or more of servers (e.g., server computer 104). Memory 110 may also include an app 138, which may include the programming units 224, 226, 228, 230, 232 shown in FIG. 2 and described below, and have some or all of the functionality attributed to the recipients 304, relationship users 306, and/or administrators/responders 308 in FIGS. 3-9.

The client computer 102 may be connected to one or more display units 122, input devices 124, output devices 126 and peripheral devices 128. The display units 122 may be internal or external monitors, television screens, handheld device displays, and the like. The input devices 124 may be any one of a keyboard, mouse, track-ball, stylus, mouse pad, mouse button, joystick, scanner or the like. The output devices 126 may be any one of a monitor, printer, plotter, copier or other output device. The peripheral devices 128 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like.

Similar to the client computer 102, the server computer 104 may include a CPU 130, a memory 132, a network interface device 134, and a storage device 136, coupled via a bus 138. The memory 132 may be a random access memory sufficiently large to hold the necessary programming and data structures that are located on the server computer 104. As shown, the memory 132 stores an operating system 140 used to manage server hardware and software executing on the server computer 102. Illustratively, the memory 132 also includes a hypertext transfer protocol (http) server 144 configured to service requests from the client computer 102. For example, the http server 144 may respond to requests for access to electronic resources (e.g., HTML documents, network information, and the like) residing on the server computer 104. However, one of ordinary skill in the art will recognize that the http server 144 is merely illustrative and embodiments of the invention may be adapted to support both known and unknown protocols.

The programming and data structures of the http server 144 may be accessed and executed by the CPU 130 as needed during operation. The server computer 104 may connect to the network 106 using the network interface device 134 (e.g., an analog modem, a wired network card, or a wireless network device).

In one embodiment, users may interact with the server computer 104 using a graphical user interface (GUI). In a particular embodiment, GUI content may comprise HTML documents (i.e., web pages) rendered on the display unit 122 coupled with the client computer 102 using the browser 120. In one embodiment, the web pages may include pages that allow a user to download a software application (app) for emergency awareness and management, and/or to register for an account with the app. The web pages may also include pages that allow a user registered for an account to log in and have some of the functionality offered by the app The memory 132 may further include an app back-end 138. The app backend 138 may comprise a software application configured to provide the ability (e.g., via the GUI) to carry out some or all of the functionality attributed to the server(s) 302 in FIGS. 3-9 and may include some or all of the programming units 208, 210, 212, 214, 216, 218, 220 shown in FIG. 2 and described below.

Accordingly, the server computer 104 may be coupled to a plurality of databases $148_1$, $148_2$ which may include a relational database $148_1$ that is queried using an SQL query, or an XML database $148_2$ queried using an XML query. The invention, however, is not limited to any particular physical database storage mechanism and may readily be extended to operate on other such mechanisms, whether currently known or unknown. While the databases $148_1$, $148_2$ are illustrated as being external to the server system, it is noted that the databases $148_1$, $148_2$ may exist on a local storage device (e.g., storage device 136) of the server computer 104, or may be accessed over the network 106. Databases $148_1$, $148_2$ may include, for example, linked organizational data, user account information, and user/client response and location information.

Figure 2:
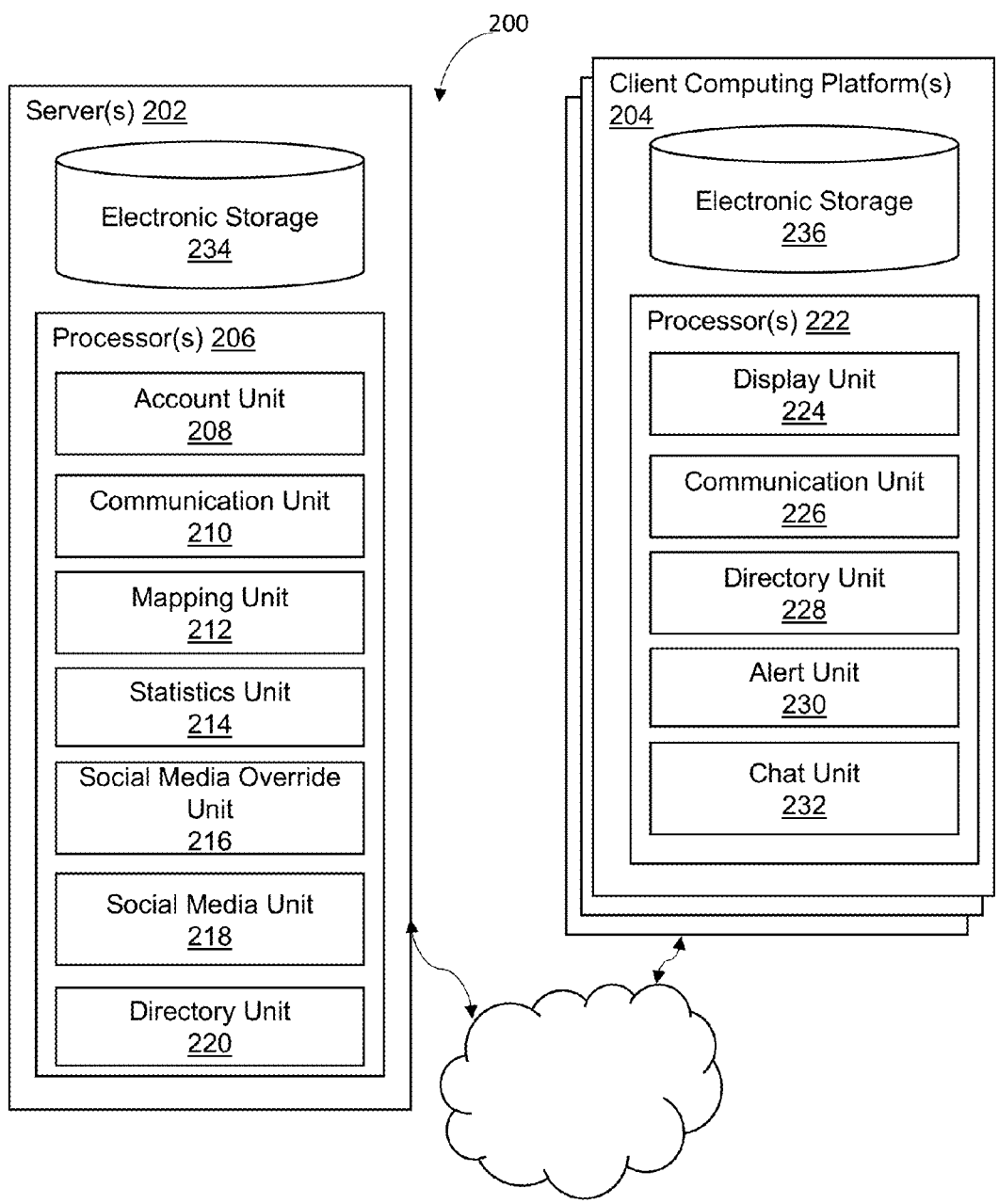
FIG. 2 illustrates a system programmed to manage organizational emergencies, in accordance with one or more implementations.

FIG. 2 illustrates a system 200 programmed to manage organizational emergencies, in accordance with one or more implementations. In some implementations, system 200 may include one or more servers 202. The server(s) 202 may be configured to communicate with one or more client computing platforms 204 according to a client/server architecture. The users may access system 200 via client computing platforms 204, for instance, to carry out monetary transactions. Client computing platforms may correspond with computing devices of recipients 204, relationship users 206, and/or administrators and responders 208 as shown in FIGS. 3-9 and described below. It is to be understood that in some implementations, different types of users have access to different functionality (e.g., computer program units) based on their login credentials, while in other implementations there are distinct functions available to each type of user and the app installed by that type of user only has the functionality (e.g. computer program units) appropriate for that type of user.

The server(s) 202 may be configured to execute one or more computer program units. The computer program units may include one or more of an account unit 208, a communication unit 210, a mapping unit 212, a statistics unit 214, a social media function override unit 216, a social media unit 218, a directory unit 220, and/or other units. As noted, the client computing platforms 204 may include one or more computer program units that are the same as or similar to the computer program units of the server(s) 202, and vice versa.

Figure 3:
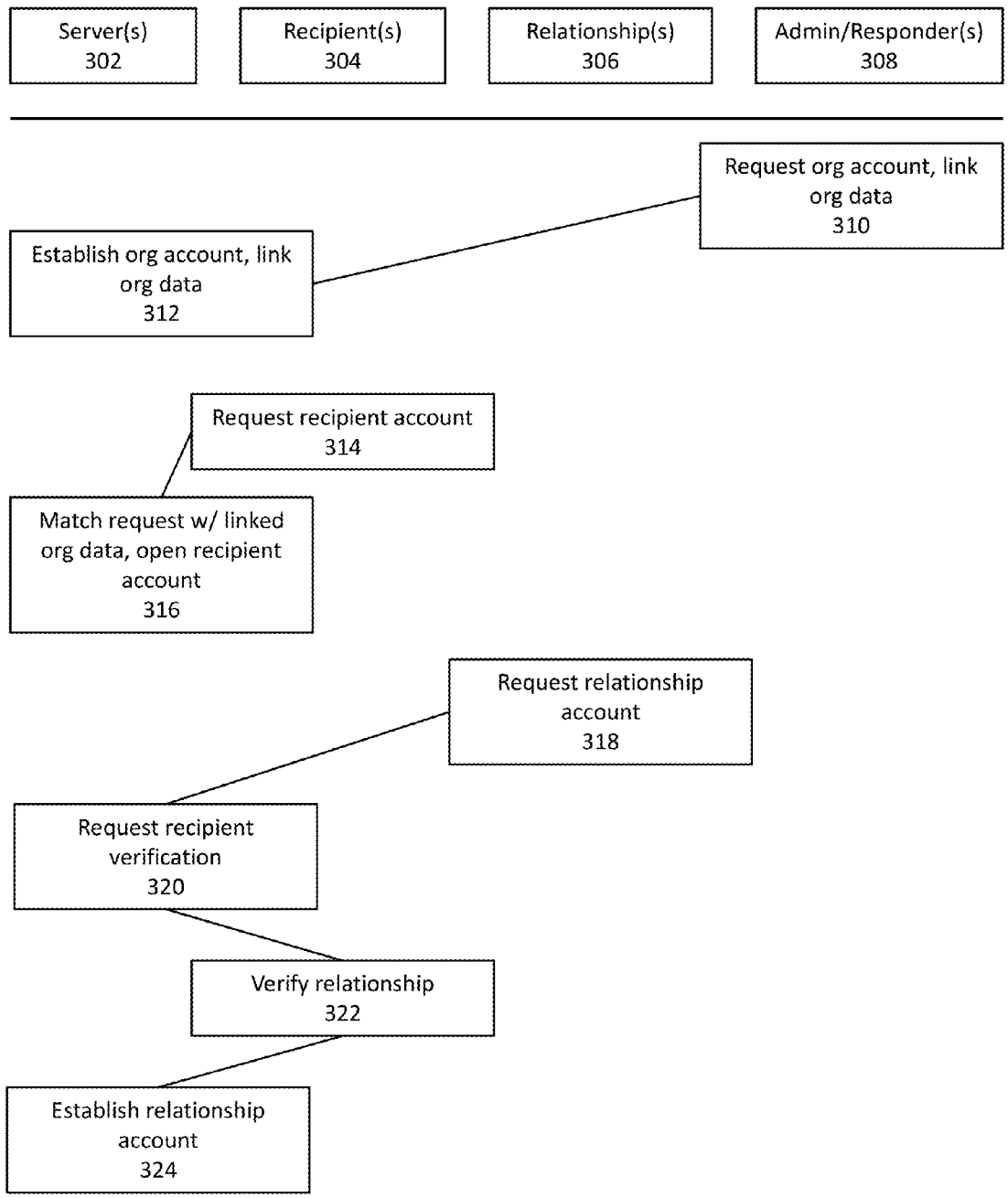
FIG. 3 is a diagram illustrating account actions associated with an organizational emergency management system, in accordance with one or more implementations of the present invention.

The account unit 208 may be programmed to carry out the server functionality shown in FIG. 3—receive requests to open new accounts, verify and establish the accounts (e.g. steps 312, 316, 320, 324), as well as routine account maintenance.

The communication unit 210 may be programmed to send and receive communications between the server(s) 202/302 and the client computing devices 204 (304, 306, 308), e.g. carry out the broadcasts, queries, etc., for example as shown as part of steps 412, 416, 420, 424, 428, 510, 516, 522, 612, 622, 628, 716, 812, 822, 912, and 926 of FIGS. 3-9.

Figure 4:
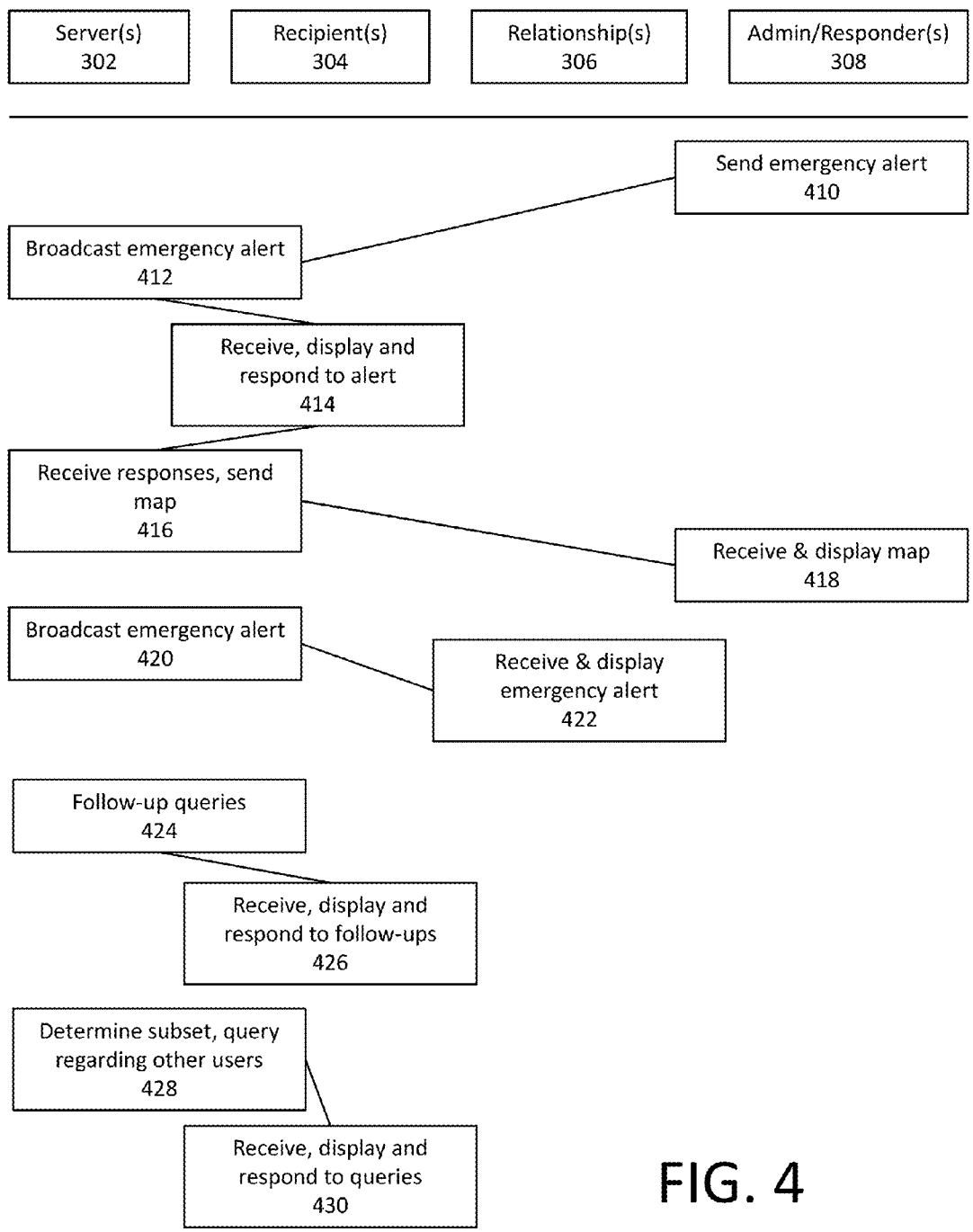
FIG. 4 is a diagram illustrating organizational emergency management methods, in accordance with one or more implementations of the present invention.
Figure 5:
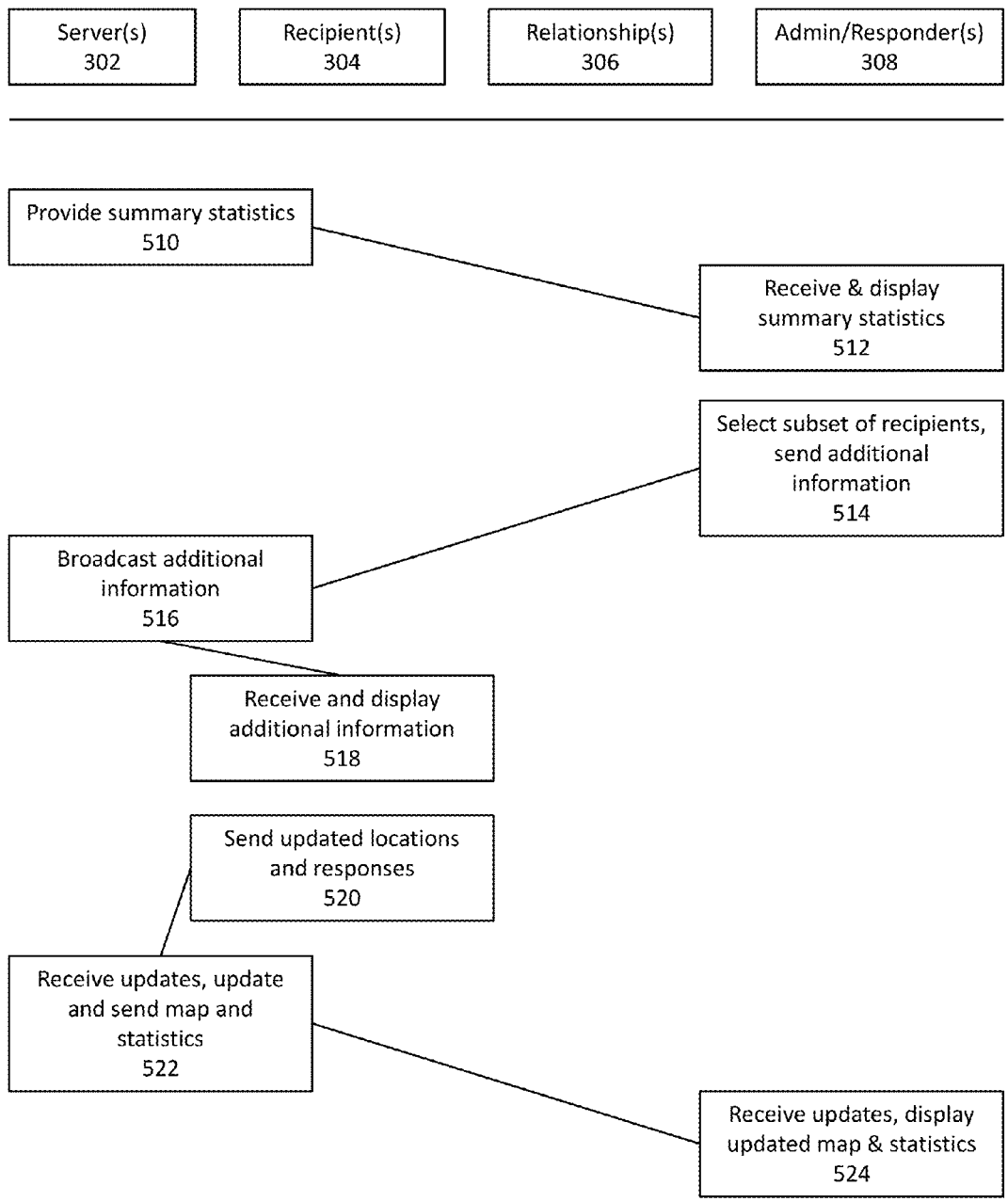
FIG. 5 is a diagram illustrating organizational emergency management methods, in accordance with one or more implementations of the present invention.

The mapping unit 212 may be programmed to carry out the mapping functionality attributed to the server(s) 302 for example in FIG. 4 at step 416 and FIG. 5 at step 522.

The statistics unit 214 may be programmed to carry out the statistical functionality attributed to the server(s) 302 for example in FIG. 5 at steps 510 and 522.

Figure 6:
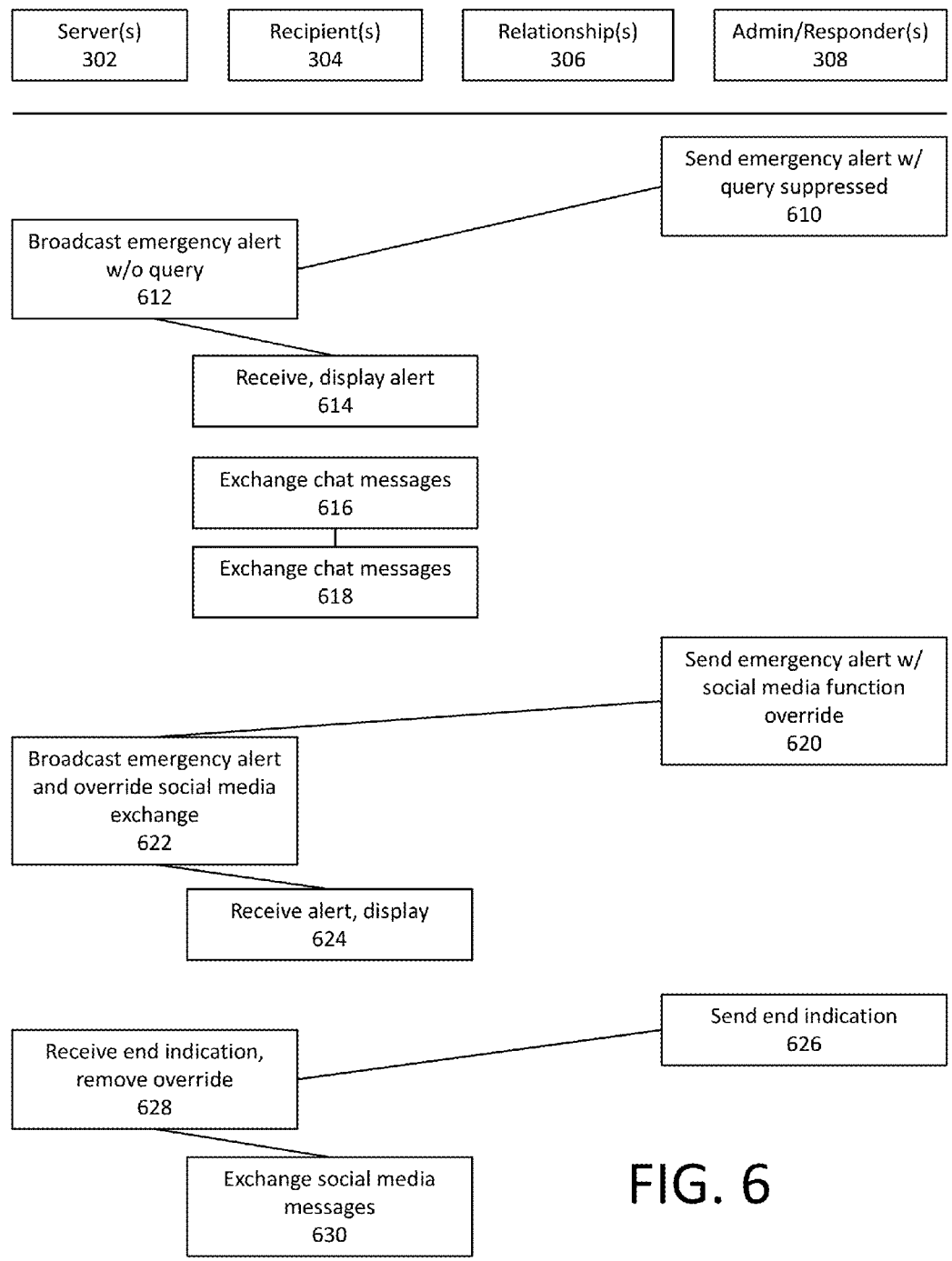
FIG. 6 is a diagram illustrating social media function override methods associated with an organizational emergency management system, in accordance with one or more implementations of the present invention.

The social media function override unit 216 may be programmed to carry out the social media function override functionality attributed to the server(s) 302 for example in FIG. 6 at steps 622 and 628.

Figure 9:
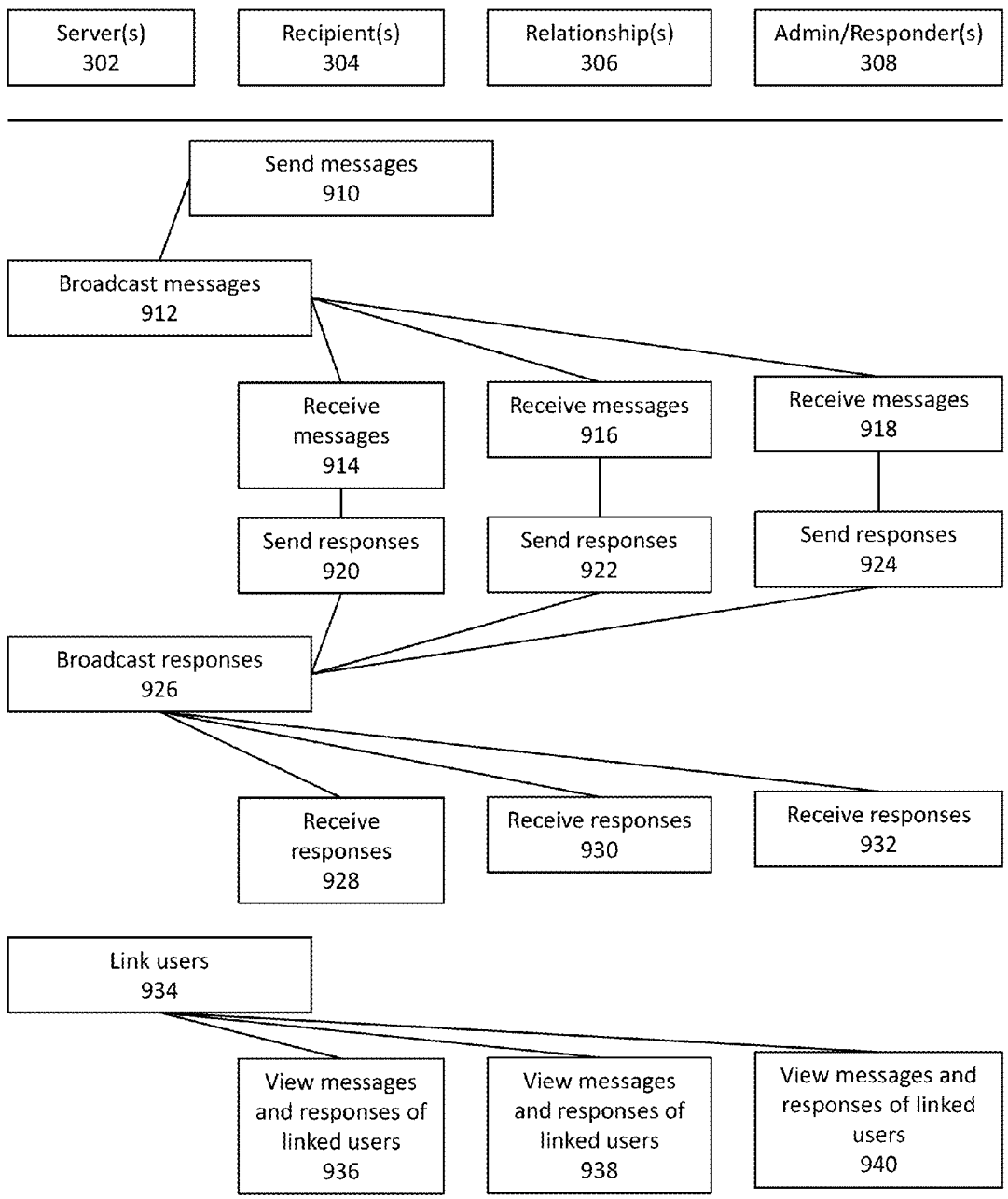
FIG. 9 is a diagram illustrating social media functions associated with an organizational emergency management system, in accordance with one or more implementations of the present invention.

The social media unit 218 may be programmed to carry out the social media functionality attributed to the server(s) 302 for example in FIG. 9 at steps 912, 926, 934.

Figure 8:
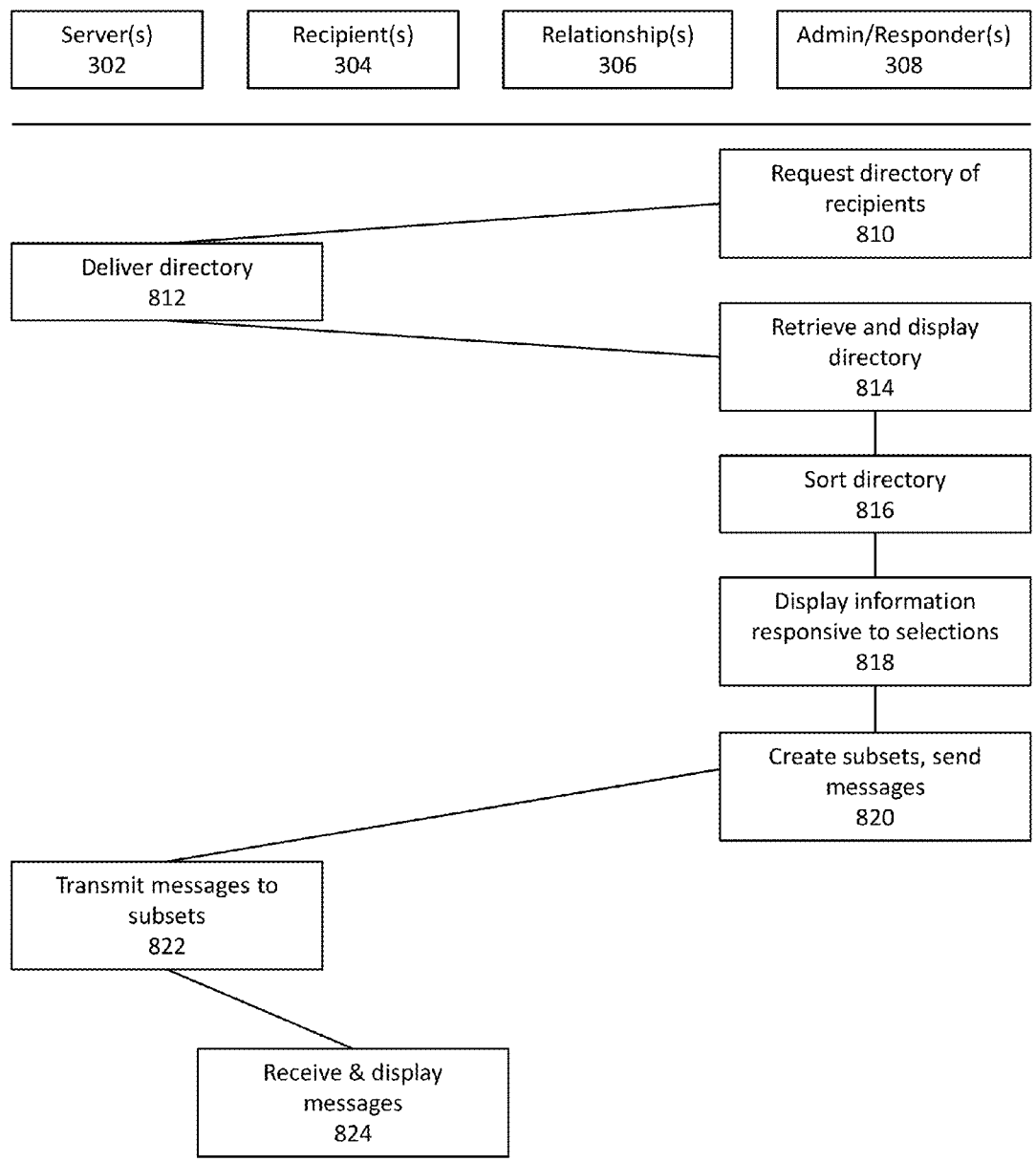
FIG. 8 is a diagram illustrating directory actions associated with an organizational emergency management system, in accordance with one or more implementations of the present invention.

The directory unit 220 may be programmed to carry out the directory functionality attributed to the server(s) 302 for example in FIG. 8 at step 812.

In implementations, client computing platforms 204 (and 304, 306, 308) may have one or more corresponding computer program units to those of server(s) 202 in order to implement the corresponding client-side (304, 306, 308) functionality shown in the figures.

In some implementations, server(s) 202 and/or client computing platforms 204 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 202 and client computing platforms 204 may be operatively linked via some other communication media.

A given client computing platform 204 may include one or more processors configured to execute computer program units. The computer program units may be configured to enable an expert or user associated with the given client computing platform 204 to interface with system 200, and/or provide other functionality attributed herein to client computing platforms 204 (and 304, 306, 308 in FIG. 3). By way of non-limiting example, the given client computing platform 204 may include one or more of a desktop computer, a laptop computer, a handheld computer, a netbook, a smartphone, a gaming console, and/or other computing platforms.

The client computing platform 204 computer program units may include one or more of a display unit 224, a communication unit 226, a directory unit 228, an alert unit 230, and a chat unit 232, and/or other units. As noted, the client computing platforms 204 may include one or more computer program units that are the same as or similar to the computer program units of the server(s) 202, and vice versa.

Figure 7:
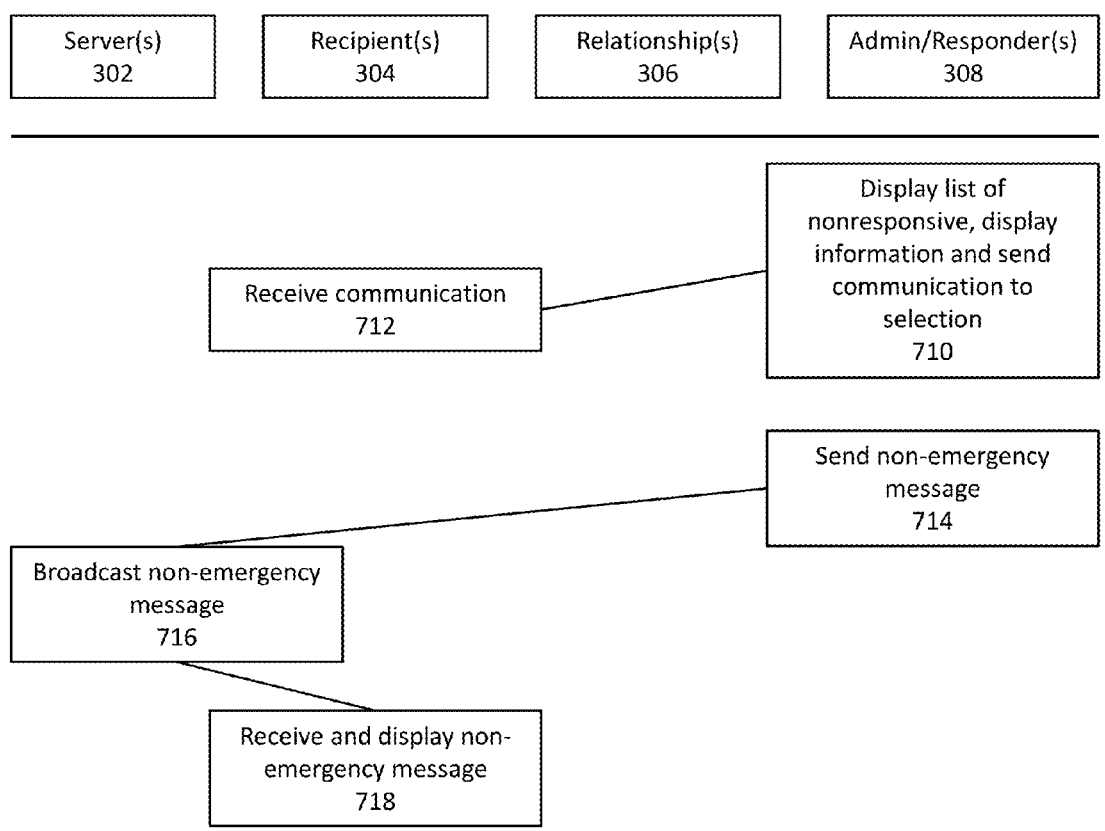
FIG. 7 is a diagram illustrating organizational emergency management methods, in accordance with one or more implementations of the present invention.

The display unit 224 may be programmed to carry out the display functionality attributed to client (304, 306, 308) computing devices as shown in FIGS. 3-9, for example in FIG. 4 at steps 414, 418, 422, 426, and 430, in FIG. 5 at steps 512, 518, and 524, in FIG. 6 at steps 614, 624, in FIG. 7 at steps 710 and 718, in FIG. 8 at steps 814, 818, and 824, in FIG. 9 at steps 914, 916, 918, 928, 930, 932, 936, 938, 940, etc.

The communication unit 226 may be programmed to carry out the sending and receiving of requests, messages, responses, and other communications between the client computing devices 204 (304, 306, 308 in FIGS. 3-9) and server(s) 202 (302 in FIGS. 3-9). For example, communication unit 226 may implement, at least in part, communications that are part of steps 310, 314, 318, 322, 410, 414, 418, 422, 426, 430, 512, 514, 518, 520, 524, 610, 614, 616, 618, 620, 624, 626, 630, 710, 714, 718, 810, 814, 820, 824, 914, 916, 918, 920, 922, 924, 928, 930, 932 in FIGS. 3-9.

The directory unit 228 may be programmed to carry out the directory functionality attributed to the client(s) 304, 306, 308 for example in FIG. 8 at steps 810, 814, 816, 818, 820.

The alert unit 230 may be programmed to carry out alert sending functionality attributed to the administrators/responders 308 for example in FIG. 4 at step 410, and in FIG. 6 at steps 610, 620, and 626.

The chat unit 232 may be programmed to carry out the chat functionality attributed to the clients 304, 306, 308 for example in FIG. 6 at steps 616 and 618.

In implementations, server(s) 202 (and 302) may have one or more corresponding computer program units to those of client computing platforms 204 in order to implement the corresponding server-side (302) functionality shown in the figures.

The server(s) 202 may include electronic storage 218, one or more processor(s) 220, and/or other components. The server(s) 202 may include communication lines, or ports to enable the exchange of information with a network and/or other computing platforms. Illustration of server(s) 202 in FIG. 3 is not intended to be limiting. The server(s) 202 may include a plurality of hardware, software, and/or firmware components operating together to provide the functionality attributed herein to server(s) 202. For example, server(s) 202 may be implemented by a cloud of computing platforms operating together as server(s) 202.

Electronic storage 218 may comprise electronic storage media that electronically stores information. The electronic storage media of electronic storage 218 may include one or both of system storage that is provided integrally (i.e., substantially non-removable) with server(s) 202 and/or removable storage that is removably connectable to server(s) 202 via, for example, a port (e.g., a USB port, a firewire port, etc.) or a drive (e.g., a disk drive, etc.). Electronic storage 218 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 218 may include one or more virtual storage resources (e.g., cloud storage, a virtual private network, and/or other virtual storage resources). Electronic storage 218 may store software algorithms, information determined by processor(s) 220, information received from server(s) 202, information received from client computing platforms 204, and/or other information that enables server(s) 202 to function as described herein.

Processor(s) 206 is configured to provide information processing capabilities in server(s) 202. As such, processor(s) 206 may include one or more of a digital processor, an analog processor, a digital circuit designed to process information, an analog circuit designed to process information, a state machine, and/or other mechanisms for electronically processing information. Although processor(s) 206 is shown in FIG. 2 as a single entity, this is for illustrative purposes only. In some implementations, processor(s) 206 may include a plurality of processing units. These processing units may be physically located within the same device, or processor(s) 206 may represent processing functionality of a plurality of devices operating in coordination. The processor(s) 206 may be configured to execute units 208, 210, 212, 214, 216, 218, 220, and/or other units. The processor(s) 206 may be configured to execute units 208, 210, 212, 214, 216, 218, 220, and/or other units by software; hardware; firmware; some combination of software, hardware, and/or firmware; and/or other mechanisms for configuring processing capabilities on processor(s) 206. As used herein, the term "unit" may refer to any component or set of components that perform the functionality attributed to the unit. This may include one or more physical processors during execution of processor readable instructions, the processor readable instructions, circuitry, hardware, storage media, or any other components. Units may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

As noted, in certain implementations, a given client computing platform 204 may include one or ore computer program units that are the same as or similar to the computer program units of the server(s) 202. The given client computing platform 204 may include one or more processors 222 that are the same or similar to processor(s) 206 of the servers) 202 to execute such computer program modules of the given client computing platform 204.

It should be appreciated that although units 208, 210, 212, 214, 216, 218, and 220 are illustrated in FIG. 2 as being co-located within a single processing unit, in implementations in which processor(s) 206 includes multiple processing units, one or more of units 208, 210, 212, 214, 216, 218, and/or 220 may be located remotely from the other units. The description of the functionality provided by the different units 208, 210, 212, 214, 216, 218, and/or 220 described below is for illustrative purposes, and is not intended to be limiting, as any of units 208, 210, 212, 214, 216, 218, and/or 220 may provide more or less functionality than is described. For example, one or more of units 208, 210, 212, 214, 216, 218, and/or 220 may be eliminated, and some or all of its functionality may be provided by other ones of units 208, 210, 212, 214, 216, 218, and/or 220. As another example, processor(s) 206 may be configured to execute one or more additional units that may perform some or all of the functionality attributed below to one of units 208, 210, 212, 214, 216, 218, and/or 220.

FIG. 3 is a diagram illustrating account actions associated with an organizational emergency management system, in accordance with one or more implementations of the present invention. An organizational administrator 308 may send a request 310 using a computing device to create an organizational account in the system to server(s) 302, which may in response establish an organizational account accordingly with information associated with the organization. As part of the request 310, the administrator 308 may link to an organizational data repository comprising identity information regarding members of the organization, which the sever(s) 302 may associate with the established organizational account. For example, a university administrator may create an account for the university and associate it with a database of students and employees of the university. A university police department and a university fire department may also create accounts for themselves so that they can broadcast emergencies and better respond to emergencies as they develop. Some manual or automated verification process may be used to ensure that the organizations and associated emergency responders are legitimate.

In implementations, administrators and emergency responders associated with organizational accounts may install applications and/or access websites different from those installed and/or accessed by recipient and relationship users, in order to utilize all the functions available to organizational accounts, such as broadcasting emergency alerts, requesting and viewing the status and location of organization members, etc. In other implementations, administrators and emergency responders associated with organizational accounts may install the same applications and access the same websites as other users, however their login information gives them access to additional functionality that is not available to those other users.

Unregistered computing devices transmit requests 314 to register as recipient computing devices associated with recipient users 304, the requests including associated identity information, and server(s) 302 check 316 the identity information associated with the requests against the identity information in the organizational data repository regarding the members of the organization, and approve the requests where a match is found. Recipients may be members of an organization, such as a university or a corporation, who are to receive emergency broadcasts from administrators of the organization and/or emergency responders, but do not initiate them. For example, a university student may go to a website or download an app, and request to create a recipient account associated with their university, which has an organizational account. As part of the sign-up process, the student may indicate their name, address, class year, and/or other identifying information, which may be checked against the database supplied by the university administrator. When a match between the input information and the database information is found, the student is accepted and a recipient account is created for them. Similar to administrative users, depending on the implementation recipient users may install a separate app and/or visit a separate website/webpage from administrative users, or may use the same app and website but be allocated functionality based on their login credentials identifying them as recipients.

Computing devices associated with future relationship users 306 transmit 314 requests to associate the computing devices with recipient computing devices, and the server(s) 302 carries out or denies the received requests by requesting verification 320 of the relationship from the recipients 304 with which an association is requested. Once the recipient users 304 involved verify 322 the relationship, the requested relationship accounts are established 324. For example, a parent of a university student may request a relationship account via an app or webpage and input the name and/or other identifying information (email address, etc.) for their child. A message may be sent (through the app, or e.g. by email) to the student/child asking them to verify that the requester is their parent and that they should be permitted to have a relationship account. The student confirms this, and a relationship account is then opened for the parent, allowing them to access relationship user functionality. Relationship accounts may be associated with users who are not members of the organization, and accordingly may be given less functionality than recipient users, for example they may only be able to view information relating to the recipient users associated with their account during emergency events, and have no other functionality available to them. Similar to administrative users, depending on the implementation relationship users may install a separate app and/or visit a separate website/webpage, or may use the same app and website but be allocated functionality based on their login credentials identifying them as relationship users.

Although in the implementation shown, persons desiring to be relationship users associated with one or more recipient users initiate the account establishment, recipients may also request that new users be added as relationship users associated with their accounts, in which case relationship status may be verified by the prospective relationship account holder 306.

FIG. 4 is a diagram illustrating organizational emergency management methods, in accordance with one or more implementations of the present invention. An emergency response system includes server(s) 302 programmed, via executable code instructions, to broadcast 412 an emergency alert to recipient 304 computing devices, responsive to instructions sent 410 from one or more administrative or responder computing devices 308. The broadcast emergency alert may include information relating to an emergency and a response request that allows recipients 304, via their computing devices, to respond 414 to the request with a binary positive or negative user status response. The binary OK/not OK response allows very fast and unambiguous responses—for example touching one of two large buttons (OK and NOT OK) displayed on the screen of the recipient's computing device. The recipient computing devices receive the emergency alert, display the response request, such that the user thereof can provide a binary positive or negative user status response by a single actuation, and transmit location information for the respective computing device and any user status response 414 back to the server 302. The recipient computing devices may also vibrate, play a special ringtone or sound, and/or display graphical elements when the emergency alert is received, to indicate an extraordinary nature of the emergency alert and increase the likelihood of the recipient providing a response.

The emergency alert sent from the administrator/responder 308 may also include one or more selected modes of transmission and the broadcast 412 may be in the selected modes, which may include one or more of email, SMS, and push notification.

The server(s) 302 receive 416 the user status responses from the recipient computing devices, and/or corresponding location information, e.g. through GPS, and send a map 416 showing known recipient computing device locations coded by corresponding response status of positive, negative, or no response received, to the administrator/responder computing devices.

For example, a university administrator may send an emergency alert that an active shooter is on campus, last seen in a particular location. The server receives this alert and broadcasts it to all recipients—students and employees of the university. The alert is received via an app on recipients' smartphones (or other devices) and is displayed, stating that an active shooter is on campus, last known location X, with the words "Are you OK?" with two large buttons, one red reading "NOT OK" and one green reading "OK". Students see the message on their phones and push OK or NOT OK, and the responses are sent to the server along with the students' locations using GPS information from their phones. Some students do not see the alert or are unable to respond. After a predetermined period of time with no response, "no response" is sent to the server along with those students' locations. The response information is turned into a map for ease of visualization, which is transmitted to the administrators and first responders so they can see where students are okay and where they are not okay. OK recipients may be color-coded green and NOT OK or nonresponsive recipients may be coded red and displayed on a map of the location where the emergency is taking place. This map may be centered on a location provided in the emergency alert and may extend for a predetermined radial distance around that location, and administrator/responder users may zoom in and out on the map, pan, etc.

Server(s) 302 also broadcasts 420 an emergency alert to the relationship computing devices. Depending on the implementation, this broadcast may be the same as the broadcast to the recipients, and simply handled differently by the relationship user computing devices because they are running a different app or have different functionality available, or may be a separate broadcast. This broadcast 420 includes the information relating to the emergency and information pertaining to one or more recipients associated with the relationship users to which the broadcast is delivered, including the associated users' status response or lack thereof, location information, and/or contact information, and is received and displayed 422 by the relationship users' 306 computing devices. For example, a college student may be a recipient user for a university and the student's parents may be relationship users associated with the student's account. If there is an emergency at the university, the parents each receive an alert that there is an emergency at the university along with an indication of where their child is and whether he responded OK, not OK, or did not respond and a map indicating their location, if known. The students phone, email, and/or other contact information may be displayed along with this information allowing the parents to attempt to contact the student through the application by phone, email, or app message, etc. Other students at the university may be other recipient users, and those student's parents may be relationship users associated with their respective children. Each of these other parents receive similar alerts, with the student information pertaining to their own child with whom their accounts are associated.

Server(s) 302 send follow-up communications and/or queries 424 to recipients from which no status response and/or negative (e.g. "NOT OK") status responses were received. These follow-up communications 424 may be automatic/algorithm (for example, periodically after a predetermined period of time has elapsed, to all such recipients or to a subset of recipients, for example within a given geographic area) and initiated without input from administrators or others, or may be responsive to administrator 308 instructions.

Recipients 304 receiving follow-up communications may respond 426. For example, five minutes after the original broadcast emergency alert, a second communication may be sent to all users updating the alert message. Additional communication can be sent thereafter.

Server(s) 302 utilize received recipient location information to identify positive status recipients 304 from which positive status responses were received (who responded, e.g. "OK") who are located closest to recipients from which no status response and/or negative status responses (e.g. "NOT OK") were received and querying them 428 as to the status and/or location of those recipients. The recipients of this query receive and display them on their computing devices, and may respond to them 430. For example, it may be determined that one student did not respond to the status request and another student 20 feet away responded that he was "OK". A query may then be sent to the student 20 feet away who responded that he was "OK", giving the non-responding recipient's name, picture, location, and/or other identifying information, and asking "Is this person okay?", and causing this student's phone to display the same two buttons as before, "OK" and "NOT OK". Using the chat function, a student may also be presented with the opportunity to provide some message, such as "that person is okay, but asleep."

This operation, as with follow-ups, may be carried out entirely automatically/algorithmically, and/or with input from one or more administrators/responders. The administrator/responder may select a subset of recipients and to query the subset as to the status and/or location of one or more of the recipients from which no status response and/or negative status responses were received. The subset might be, for example, recipients who are not near the location where the emergency is believed to be, in order to get information on some non-responders without a likelihood of putting the queried recipients in danger.

FIG. 5 is a diagram illustrating organizational emergency management methods, in accordance with one or more implementations of the present invention. The server(s) 302 here provide summary statistics 510 to the administrators/responders, including number of recipient computing devices located within a given predetermined geographical area and/or number of recipient computing devices located within the given predetermined geographical area that have associated a negative user status response or no user status response. The administrators/responders receive and display 512 these summary statistics on their computing devices and can use them to manage the emergency. The predetermined geographical area may include a building, a property, a campus, an area including a building, property, and/or campus and a certain surrounding area, and/or a given predetermined radius around a point. For example, if the emergency is an active shooter at a university as discussed above, and the shooter's location is identified as inside a certain building, the server(s) 302 may, automatically using preset algorithms or preferences, or manually according to administrator/responder instructions, provide to the administrators/responders the number of recipients known to be located within the building or within a 100 foot radius around it, as well as the number of those recipients who have responded that they are NOT OK and who have not responded at all.

Administrators/responders may send additional information pertaining to the emergency alert to the recipients or a selected subset thereof 514, the server(s) 302 may broadcast this additional information 516 to the recipients or the subset thereof, and the recipients of the additional information will receive and display 518 the additional information on their smart phones or other computing devices. The selected subset may be a subset of the recipients located within a specified geographic area and/or having a given corresponding user status response (e.g. "NOT OK", "OK", no response). For example, administrators may send a message "Shooter spotted heading towards Murphy building" to all recipients within 100 feet of the Murphy building. Or, responders may send the message "Stay where you are. Lock doors" to recipients in the same building as the emergency who responded that they are OK.

Recipient locations may be sent 520 to the server(s) 302 periodically, for example in real-time or after a predetermined period of time such as every five minutes. Recipients may also update their response at any time, for example from OK to NOT OK or vice versa, and their computing device will send this updated response to the server(s) 302. A response update may be accompanied by an updated location. The server(s) 302 receive these updates, use them to update the map and summary statistics and send the updated map and summary statistics 522 to the administrators and emergency responders 308, which receive the updates and display the updated map and statistics 524 on their computing devices.

FIG. 6 is a diagram illustrating social media function override and query-less broadcast methods associated with an organizational emergency management system, in accordance with one or more implementations of the present invention. An administrator/responder 308 may send an emergency alert without a response request or query 610, for example by selecting to suppress the query function when sending the alert. The server(s) 302 receive the emergency alert and broadcast it 612 to the recipients 304, the emergency alert including information relating to the emergency but without a response request. The alert is received and displayed 614 on the recipients' computing devices. For example, an administrator of a university might send an emergency alert "Storm expected to arrive in 30 minutes" and the student recipients would receive the alert on their devices but they would not be given an opportunity to report their status (OK/NOT OK) since the storm had not yet arrived.

The recipients 304 may have access to chat functionality via their programmed computing devices (e.g. smartphone app) allowing them to exchange chat message 616, 618 between one another. Recipients may also have access to social media functionality allowing them to exchange social media messages with one another, for example as described in FIG. 9 and the accompanying text. When an administrator/responder sends an emergency alert 620, the alert may, automatically or at the option of the admin or responder, be broadcast 622 by server(s) 302 and the social media functions may be overridden, stopping normal exchange of social media messages and delivering the alert to the recipients 304, regardless of how the recipient computing devices are currently being utilized. The recipient 304 computing devices receive and display 624 the alert. When the emergency is over, an administrator or responder may send 626 an indication that the emergency is over, and server(s) 302 may receive the indication and remove the override of the recipient social media function 628, whereupon the recipients may exchange social media messages 630 using the chat functionality once more.

FIG. 7 is a diagram illustrating organizational emergency management methods, in accordance with one or more implementations of the present invention. The summary statistics 510 from FIG. 5 may include a number and/or percentage of recipients from which a response has been received and a list of recipients from whom a response has not been received. The administrative or responder may select one or more recipients from the list on their computing device and in response their computing device may display further information regarding the selected recipients and allow the administrator/responder to initiate an email, chat message, or phone call directly to the selected recipient(s) 710. The selected recipients 712 would then receive the email, chat message or phone call 712 from the administrator/responder.

The server(s) 302 may be further programmed via executable code instructions to receive a non-emergency message sent 714 from one of the administrative or responder computing devices and broadcast it 716 to the recipients' computing devices 304 by email, SMS, and/or application push notification. The recipients receive 718 the non-emergency message via the selected method. For example, a university administrator may broadcast a message via an app push notification reading "Tomorrow is school spirit day."

FIG. 8 is a diagram illustrating directory actions associated with an organizational emergency management system, in accordance with one or more implementations of the present invention. The administrative and/or responder 308 computing devices are programmed, via executable code instructions, to request 810 from server(s) 302, retrieve and display 814 a directory of the recipients, to sort 816 the directory by user status response, to display 818 information for individual computing devices and/or users from the directory based on selections by the administrator/responders, and to create temporary subsets of the responders devices based on received selections and transmit communications 820 to all members of the temporary subsets simultaneously. Server(s) 302 deliver 812 the requested directories to the administrators or responders and receive the messages sent from the administrators/responders and transmit them 822 to the subsets of recipients 304, which receive and display the messages 824 on their computing devices.

FIG. 9 is a diagram illustrating social media functions associated with an organizational emergency management system, in accordance with one or more implementations of the present invention. The server(s) 302 are programmed via executable code instructions to receive messages sent 910 from the recipients 304 and broadcast the messages 912 to the recipients 304, administrators and/or responders 308, and relationship users 306, and to receive responses from the recipients 304, administrators and/or responders 308, and/or the relationship users 306 to the messages and broadcast the responses 926 to the recipients 304, the administrator and/or responder computing devices 308, and the relationship users 306, and to link 934 two or more recipients 304, administrators and/or responders 308, and/or relationship users 306, such that the linked users are sent the messages and the responses from each other more prominently than the messages and the responses from others. Although recipients 304 are shown as sending the first messages 910, messages in implementations may originate from any user, whether recipient, administrator or responder 308, or relationship 306. Recipients, relationship users and administrators/responders 304, 306, 308 receive messages 914, 916, 918 on their computing devices and send responses 920, 922, 924, and receive each others' responses 928, 930, 932, and messages and responses from linked users are displayed more prominently on their computing devices and are viewed 936, 938, 940.

For example, an application installed on the recipient 304, relationship users 306, and administrator and responder 308 computing devices utilizes server(s) 302 to implement social media functionality, with users 304, 306, 308 able to send messages that are displayed to some or all other users 304, 306, 308, respond to messages and responses sent by other users 304, 306, 308, and link to other users 304, 306, 308 as e.g. friends, connections, etc. Messages 910 may for example be "posts" within a tile, containing information which the recipient wishes to share with other users. Responses 920, 922, 924 may for example be indications of approval of the received messages 914, 916, 918, such as "likes", comments to the received messages 914, 916, 918, such as text statements that appear with the received messages 914, 916, 918 when viewed by others, or shares of the received messages 914, 916, 918, where the received messages are re-broadcast to ensure they are seen by users linked to the person sharing them. Responses 920, 922, 924 may include text, images, videos, and/or audio, which a user may upload from their computing device. In an instance where admin/responder 308 is sending messages 308, the sending of the messages may be prompted by creation of a tile by the admin 308 as described in more detail with reference to FIG. 18. When creating the tile, the admin 308 may designate which users have access to the tile, and messages may be sent 910 to those users, informing them of the new tile to which they have access.

Extensive use data may be extracted from user activity. For example, the types of content—tiles, posts, etc., and formats, which are most popular, may be determined and used to suggest new tiles, to select advertisers on the system and sell advertisements, and the like.

Figure 10:
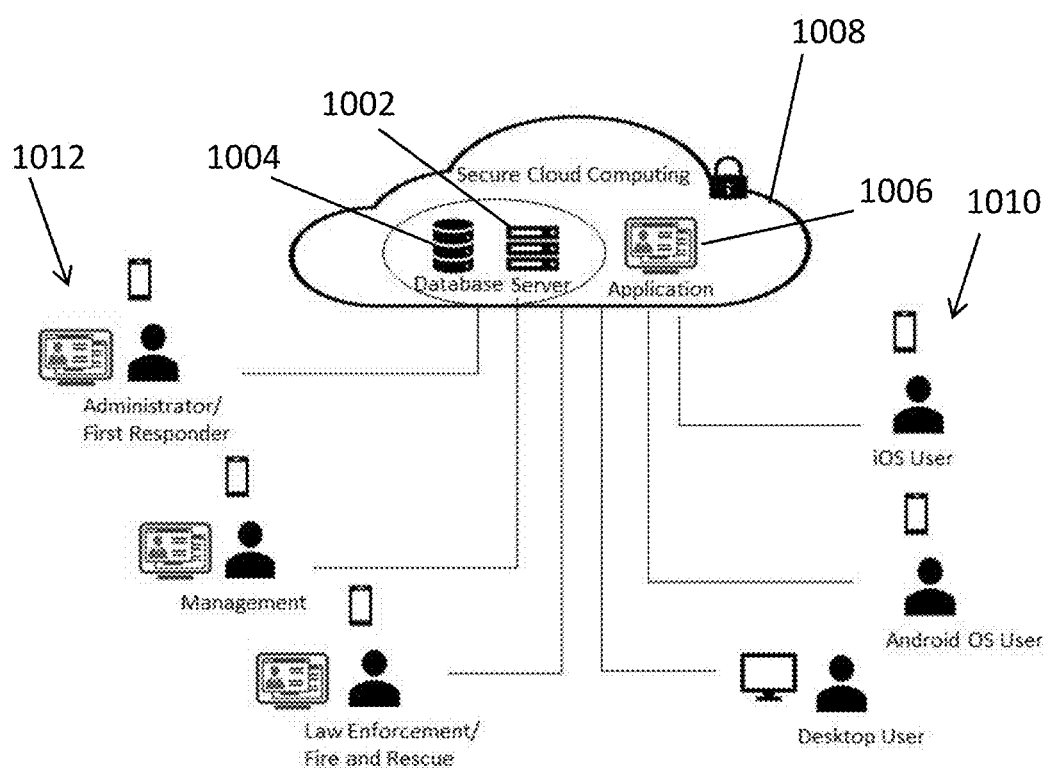
FIG. 10 is a diagram illustrating a system architecture of an organizational emergency management system, in accordance with one or more implementations of the present invention.

FIG. 10 is a diagram illustrating a system architecture of an organizational emergency management system, in accordance with one or more implementations of the present invention. A secure cloud environment 1008 holds database 1004, server 1002 and server application 1006, which communicate with administrative/responder users 1012 and recipient/relationship users 1010.

Figure 11:
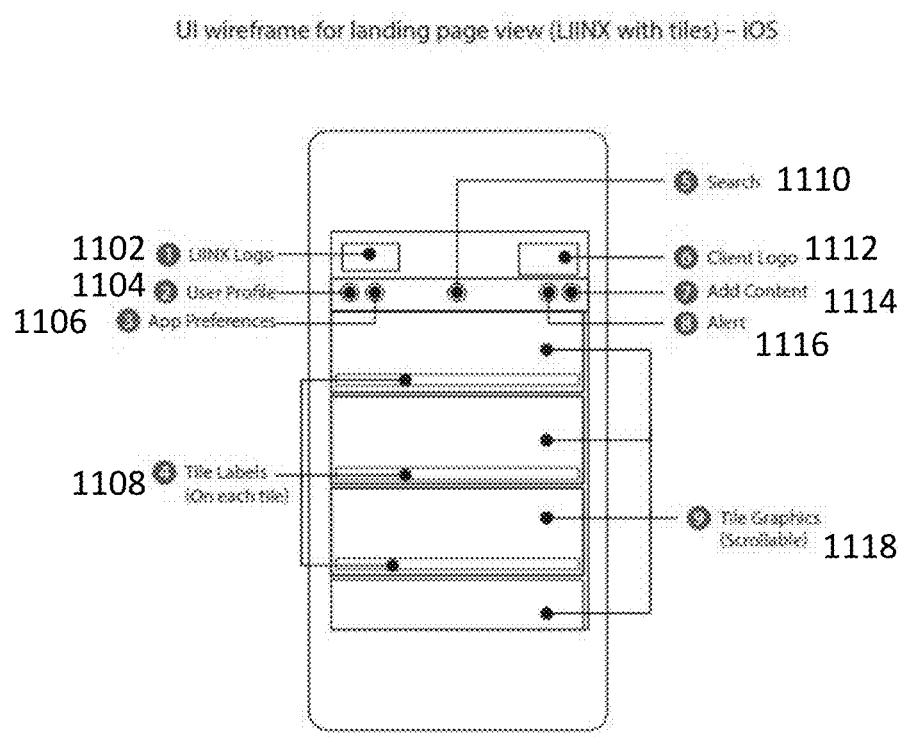
FIG. 11 is a UI wireframe for a landing page view of a mobile application for organizational emergency management, in accordance with one or more implementations of the present invention.

FIG. 11 is a UI wireframe for a landing page view of a mobile application for organizational emergency management, in accordance with one or more implementations of the present invention. The wireframe shows placement of a logo 1102, user profile button 1104—pressing it will show the current users profile, App preferences button 1106—Pressing it will present you with options to change the available app preferences that the user can change, the title of the tile 1108, search button 1110—pressing this button will allow you to search for users that are part of the organization, client logo 1112, add tile button 1114—pressing this button presents you with a series of screens that allows you to create a new tile, alert button 1116—pressing this button will present you with a pop-up window to create an alert, button is only visible to admins, and graphic image of the tile 1118. A tile is a way to create and organize topics for discussion and may be part of the social media/social networking functionality. A tile may represent both front-end and back-end structure. On the front end, topics may be displayed on a user's screen as tiles, which a user may click to view posts within that topic. On the back end, posts and associated information may be organized by the tile and topic they correspond to. Creating tiles may be restricted to admins, and access rights of other users to specific tiles may be set and managed by admins.

Figure 12:
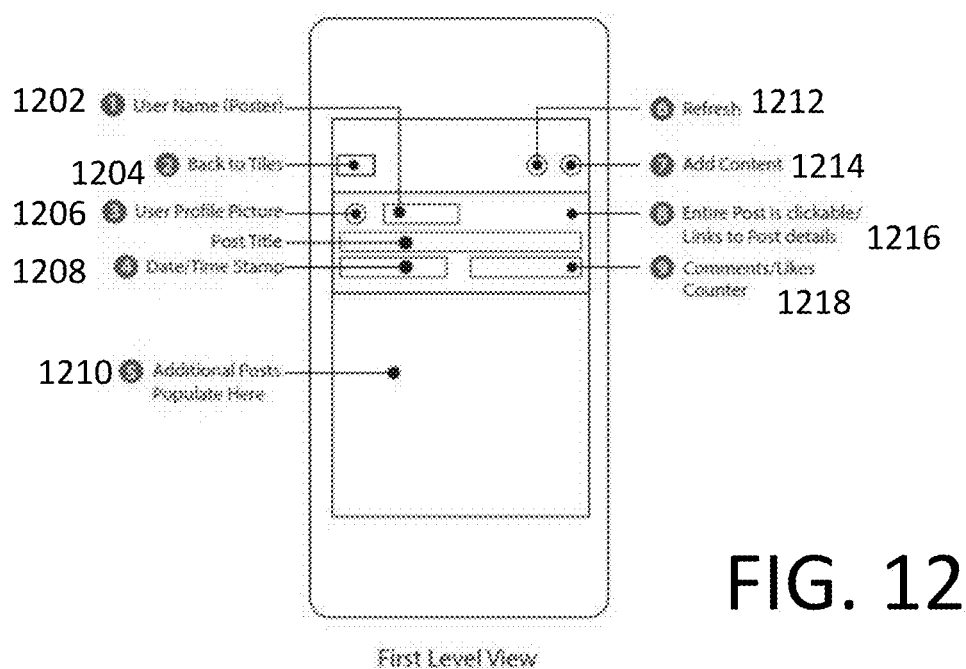
FIG. 12 is a UI wireframe for a first level posts view of a mobile application for organizational emergency management, in accordance with one or more implementations of the present invention.

FIG. 12 is a UI wireframe for a first level posts view of a mobile application for organizational emergency management, in accordance with one or more implementations of the present invention. The wireframe shows placement of the name of the person that created the post 1202, a button that takes you back to the main tile view 1204, the profile picture of the person that created the post 1206, date and Time stamp of when the post was created 1208, area that shows additional posts under the tile that was selected 1210, button that refreshes the list of posts under the selected tile 1212, button that allows the user to begin the creation of a new post under the selected tile 1214, and comments/like counter 1218—the amount of comments and likes for the particular post. Clicking anywhere on the list post 1216 will take you to the details of the post.

Figure 13:
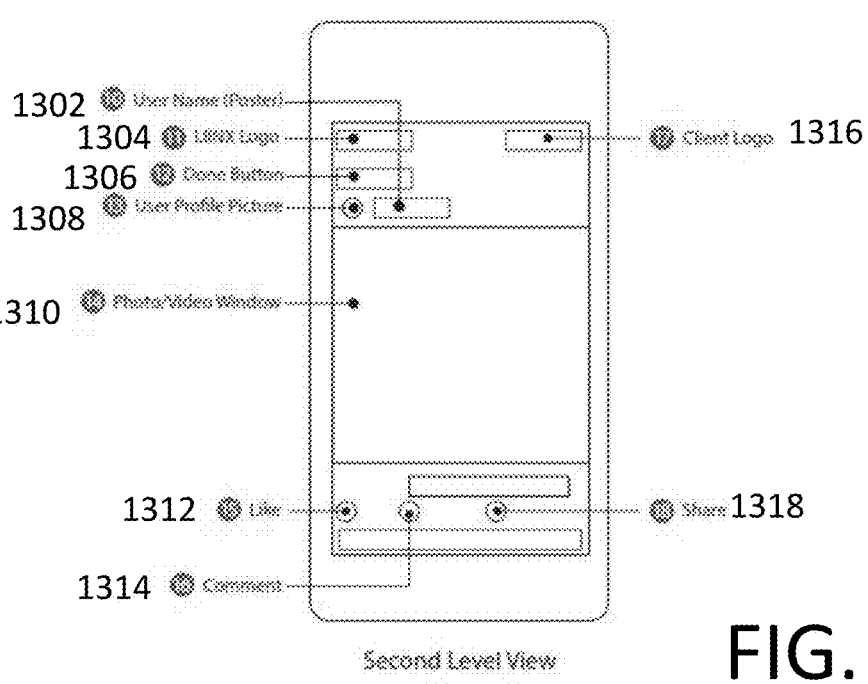
FIG. 13 is a UI wireframe for a second level posts view of a mobile application for organizational emergency management, in accordance with one or more implementations of the present invention.

FIG. 13 is a UI wireframe for a second level posts view of a mobile application for organizational emergency management, in accordance with one or more implementations of the present invention. The wireframe shows placement of the name of the person that created the post 1302, a logo image 1304, a done button 1306 that closes the post view, the profile picture of the person that created the post 1308, a photo or video that was posted 1310 (Optional), a like button 1312—if a user presses the button, the like is incremented by one and graphic turns orange, a comment button 1314—if pressed, the user is presented with a view that allows him/her to type in a comment about the post, a client Logo graphic 1316, and a share button 1318—if pressed, the user is presented with a view that allows him/her to select user(s) to share the post with.

Figure 14A:
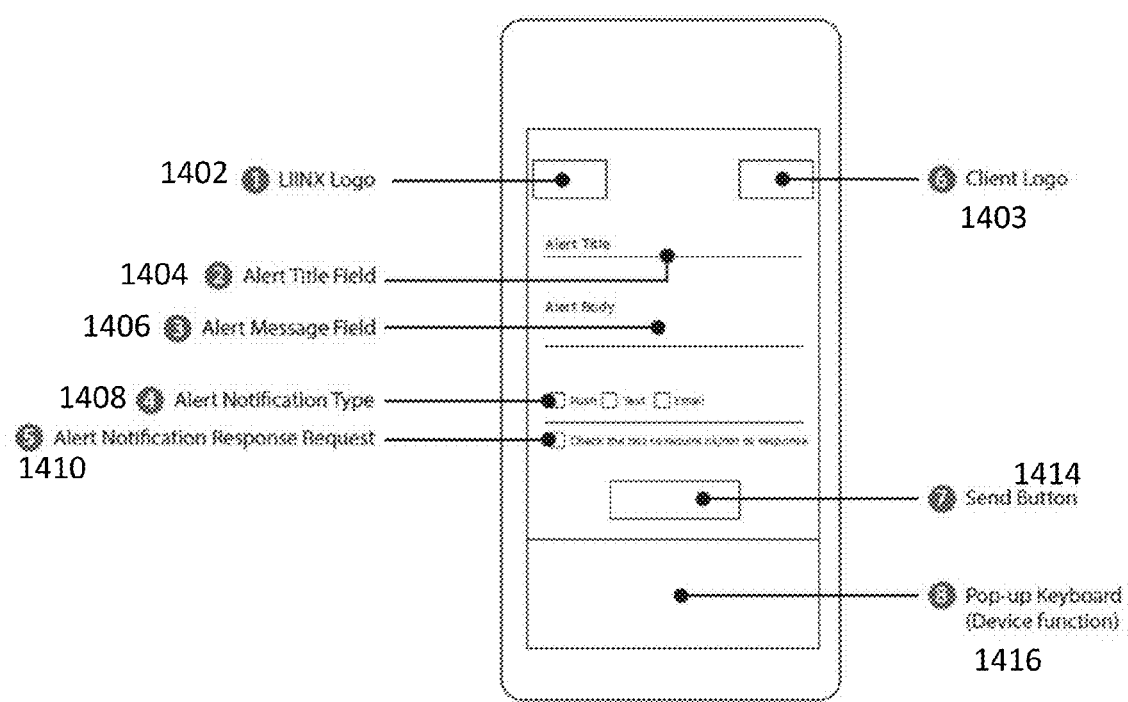
FIG. 14A is a UI wireframe for an admin side alert screen of a mobile application for organizational emergency management, in accordance with one or more implementations of the present invention.

FIG. 14A is a UI wireframe for an admin side alert screen of a mobile application for organizational emergency management, in accordance with one or more implementations of the present invention. The wireframe shows a display screen, here bearing logos 1402, 1403, that allows the admin to create the alert, the title of the alert (Emergency) 1404, the alert message 1406, set an alert notification type 1408—here push, text or email, request an alert notification response request 1410, and send the alert with send button 1414 to everyone in the organization. Keyboard pop-up 1416 allows the admin to type in the alert title and message.

Figure 14B:
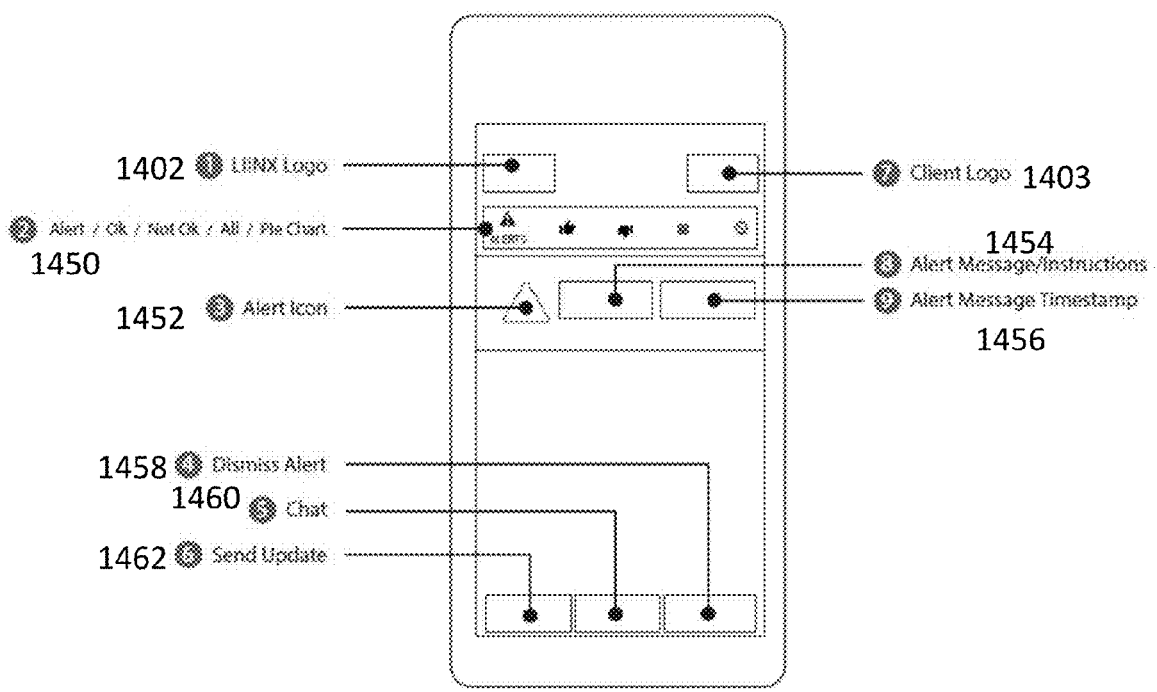
FIG. 14B is a UI wireframe for an admin side alert in progress screen of a mobile application for organizational emergency management, in accordance with one or more implementations of the present invention.

FIG. 14B is a UI wireframe for an admin side alert in progress screen of a mobile application for organizational emergency management, in accordance with one or more implementations of the present invention. The wireframe shows a display screen, here bearing logos 1402, 1403, that allows the admin to manage an alert in progress and view responses. Response view bar 1450 displays the number of OK responses, NOT OK responses, total responses, and a pie chart to visually illustrate the proportion of respondents ho responded OK/NOT OK. Alert icon 1452 shows that an alert is in progress, alert message/instructions field 1454 shows the latest alert message/instructions, and alert message timestamp 1456 provides the time that message was sent. Dismiss alert option 1458 allows the admin user to end the alert. Chat option 1460 allows the admin user to chat with members of the organization. Send update option 1462 allows the admin user to send another message to the organization members relating to the alert.

Figure 15:
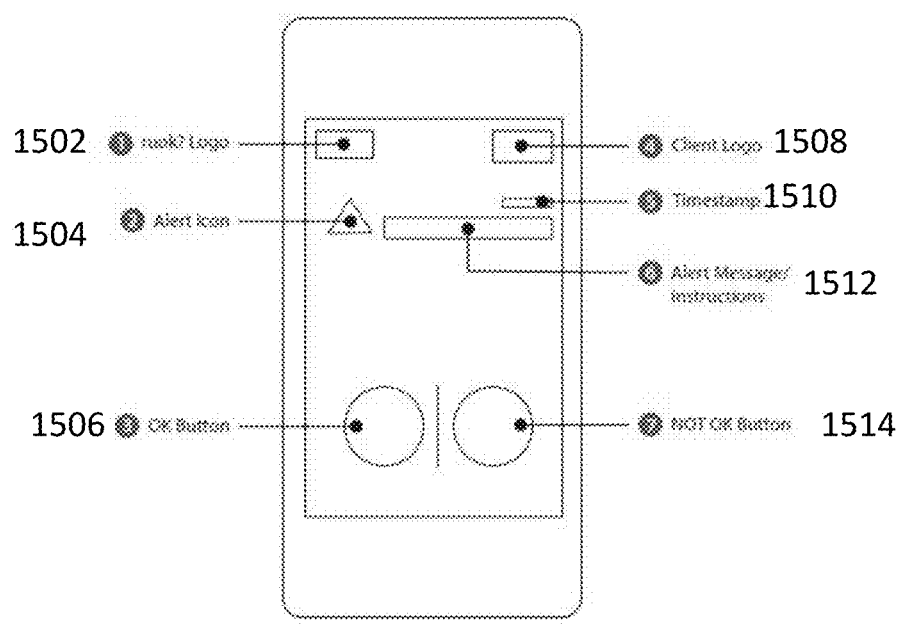
FIG. 15 is a UI wireframe for a recipient side alert screen of a mobile application for organizational emergency management, in accordance with one or more implementations of the present invention.

FIG. 15 is a UI wireframe for a recipient side alert screen of a mobile application for organizational emergency management, in accordance with one or more implementations of the present invention. The wireframe shows placement of a logo 1502, an alert icon 1504 signifying an alert message, a circular button 1506 that says "OK"—pressing this button signifies that the user is OK during the emergency, a client logo 1508, the timestamp 1510 of when the alert was created, the message 1512 of the alert, and a circular button 1514 that says "Not OK"—pressing this button signifies that the user is NOT OK during the emergency.

Figure 16:
FIG. 16 is a user functionality table for a system for organizational emergency management, in accordance with one or more implementations of the present invention.

FIG. 16 is a user functionality table 1600 for a system for organizational emergency management, in accordance with one or more implementations of the present invention, showing what functionality is available for different types of users. In these embodiments, there are three types of accounts, super admins, client admins, and users. Super admins are the only type of account that can create a new organization—all other functionality is available to both super admins and client admins, except for status selection (e.g. OK/NOT OK) in emergency/alert events, which is reserved for users. User functionality is limited to posting, commenting, sharing, and liking social media functions, communicating during alerts/emergencies, and selecting status (e.g. OK/NOT OK) during alerts/emergencies. Super admins and client admins can also set up organizations, manage users, manage tiles (set users with access to each tile, etc.), manage alerts, view reports on user status, locate users, and end alerts. In these embodiments, each of these steps may be the same as or similar to analogous steps discussed with regard to other figures.

FIG. 17 shows a create alert web page of an organizational emergency management web application, in accordance with one or more implementations of the present invention. A table of the Alerts 1704 is shown. Clicking on an Alert within the title column brings the title of the selected alert 1708 and a table of Alert postings 1706. To view details of an Alert, click on an alert and that opens a window to display a new page. Box 1710 includes a pie chart graphic showing proportions of users who are OK, Not OK, or did not respond, and a send update button for sending updates to selected groups of recipients. Dismiss Alert button 1714 lets an admin/responder dismiss an alert. A list 1712 shows users and their statuses and contact information. Create alert button 702 allows the user to create a new alert.

Figure 18:
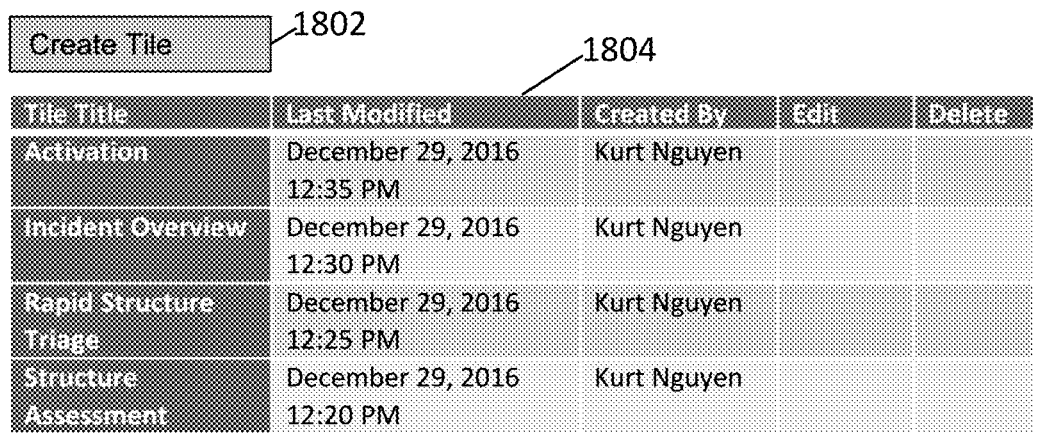
FIG. 18 shows a create a tile web page of an organizational emergency management web application, in accordance with one or more implementations of the present invention.

FIG. 18 shows a create a tile web page of an organizational emergency management web application, in accordance with one or more implementations of the present invention. A tile is a way to create and organize topics for discussion and may be part of the social media/social media functionality. Tiles can be created by users such as an Administrator or Manager with permission to create tiles. Tiles can be viewed by users with permission, which may be set by the creator of a tile. To Create a Tile, a user clicks on button 1802 located above the View Pages Table 1804. There is then a Tile Title field to insert a title, a Text field to insert text, a button to select a picture from a computer file, and a button to save the tile. A Delete Tile function has a confirm dialogue box. To edit a Tile, a user may click on an edit button which gives the following function Icon to Tile Page and Icon to Delete Page, Change Title field, Change text field, Change picture, and Button to save Tile. To View Posts a new screen may be displayed that lists all current Posts in a table format associated with the Tile.

Figure 19:
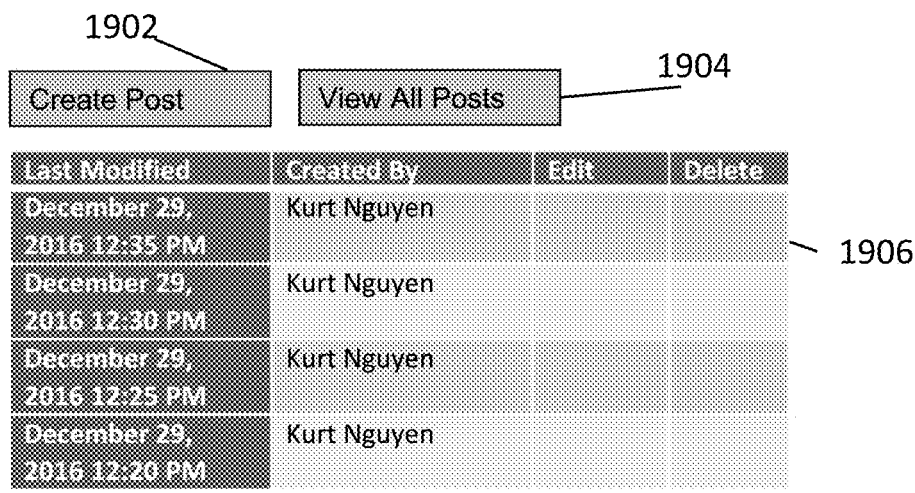
FIG. 19 shows a create a post web page of an organizational emergency management web application, in accordance with one or more implementations of the present invention.

FIG. 19 shows a create a post web page of an organizational emergency management web application, in accordance with one or more implementations of the present invention. A Post is a way for users to create content that can include text, images and videos for discussion, and may be part of the disclosed social networking/social media functionality. Posts can be viewed by users with permission, which may be set by the creator. A Post is created and organized within a Tile. Posts can be created by users such as an Administrator or Manager with permission to create posts. To create a Post, a user clicks on a button 1902 located above the view Posts table 1906 to create post that opens a popup window which gives the following functions: Text field to insert text, Button to select picture from computer, Button to save Post. When the Post is saved, it is associated with the parent Tile. To Edit Posts, a user clicks on a button to edit a post, which opens a window which gives the following functions: Change Title field, Change text field, Change picture, Button to save. A user may click button 1904 to view all posts.

Figure 20:
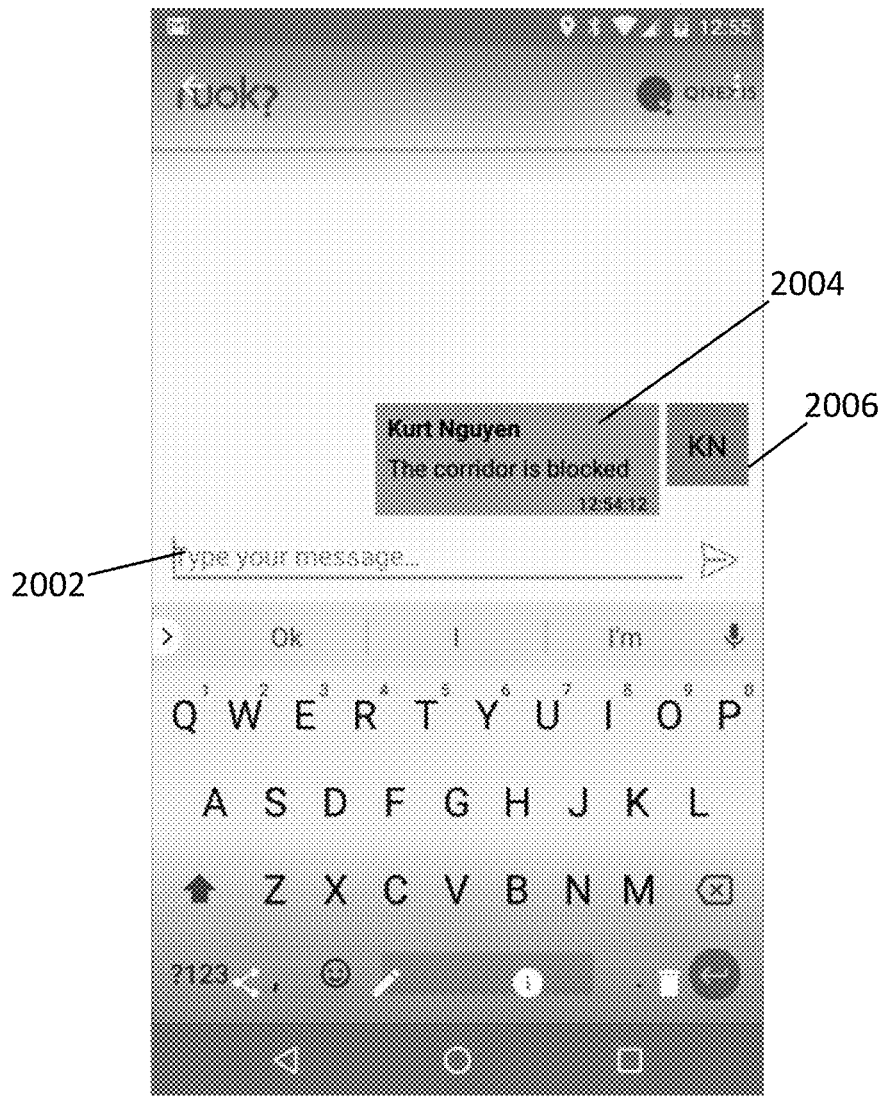
FIG. 20 shows an emergency chat function screen, in accordance with one or more implementations of the present invention.

FIG. 20 shows an emergency chat function screen, in accordance with one or more implementations of the present invention. Chat message input field 2002 allows the user to input a chat message and send it to other users. Sent chat message 2004 shows how the chat messages are displayed to users and identifier 2006 is displayed next to each message to quickly identify the user who sent the chat message.

Figure 21:
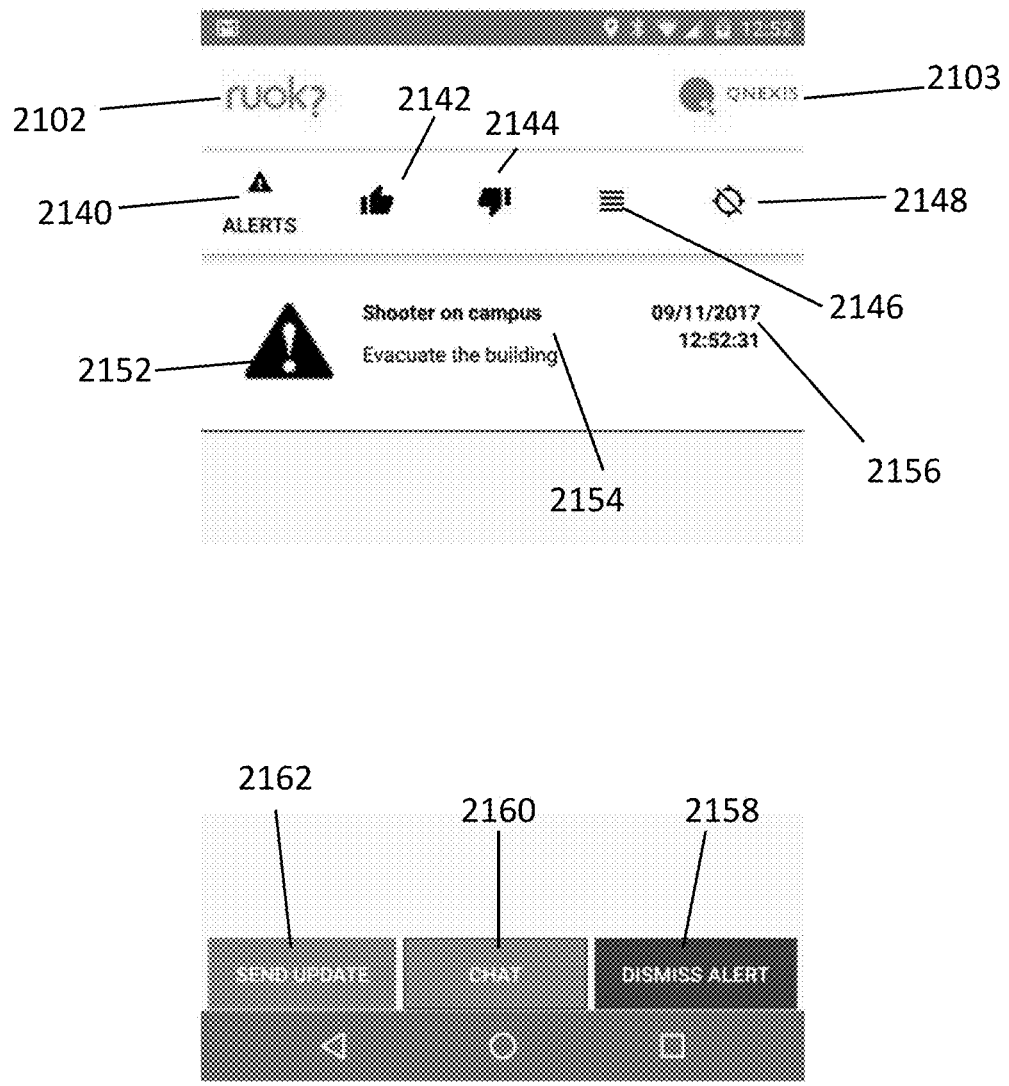
FIG. 21 shows an admin side alert in progress screen of a mobile application for organizational emergency management, in accordance with one or more implementations of the present invention.

FIG. 21 shows an admin side alert in progress screen of a mobile application for organizational emergency management, in accordance with one or more implementations of the present invention. A display screen bears logos 2102, 2103, that allows the admin to manage an alert in progress and view responses. Alert ico 2140 identifies alerts in progress, thumbs up icon 2142 shows the number of OK responses, thumbs down icon 2144 shows the number of NOT OK responses, icon 2146 shows total number of responses, and a pie chart 2148 visually illustrates the proportion of respondents who responded OK/NOT OK. Alert icon 2152 shows that an alert is in progress, alert message/instructions field 2154 shows the latest alert message/instructions, and alert message timestamp 2156 provides the time that message was sent. Dismiss alert option 2158 allows the admin user to end the alert. Chat option 2160 allows the admin user to chat with members of the organization. Send update option 2162 allows the admin user to send another message to the organization members relating to the alert.

Figure 22:
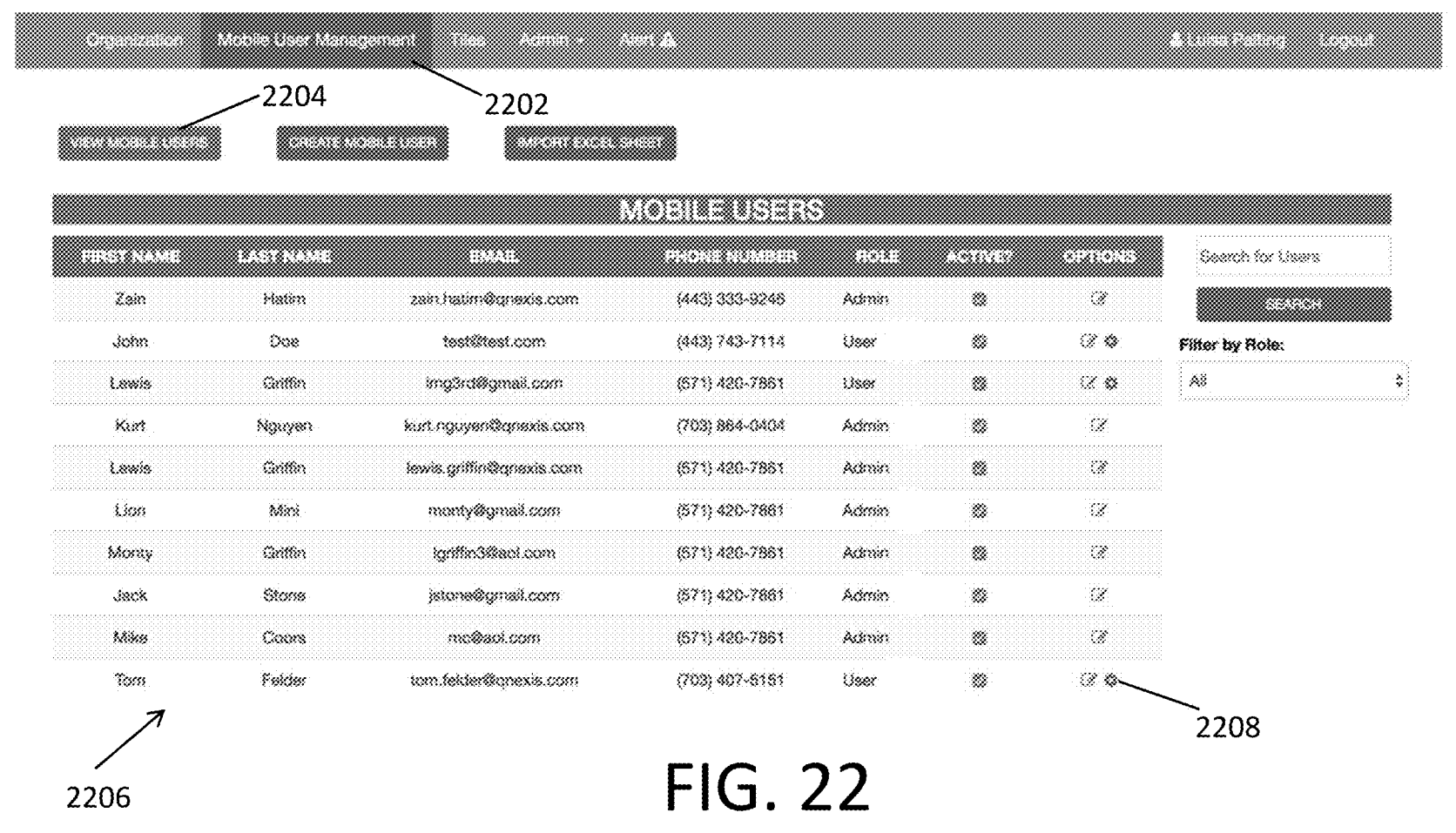

FIG. 22 shows a view mobile users web page of an organizational emergency management web application, in accordance with one or more implementations of the present invention. An admin may navigate to the mobile user management selection 2202 on the top navigation bar and select the view mobile users option 2204, causing a list of mobile users 2206 to be displayed with information including name, contact information role/account type, activity, and edit/setting options. Gear icon 2208 leads to the page of FIG. 25.

Figure 23:
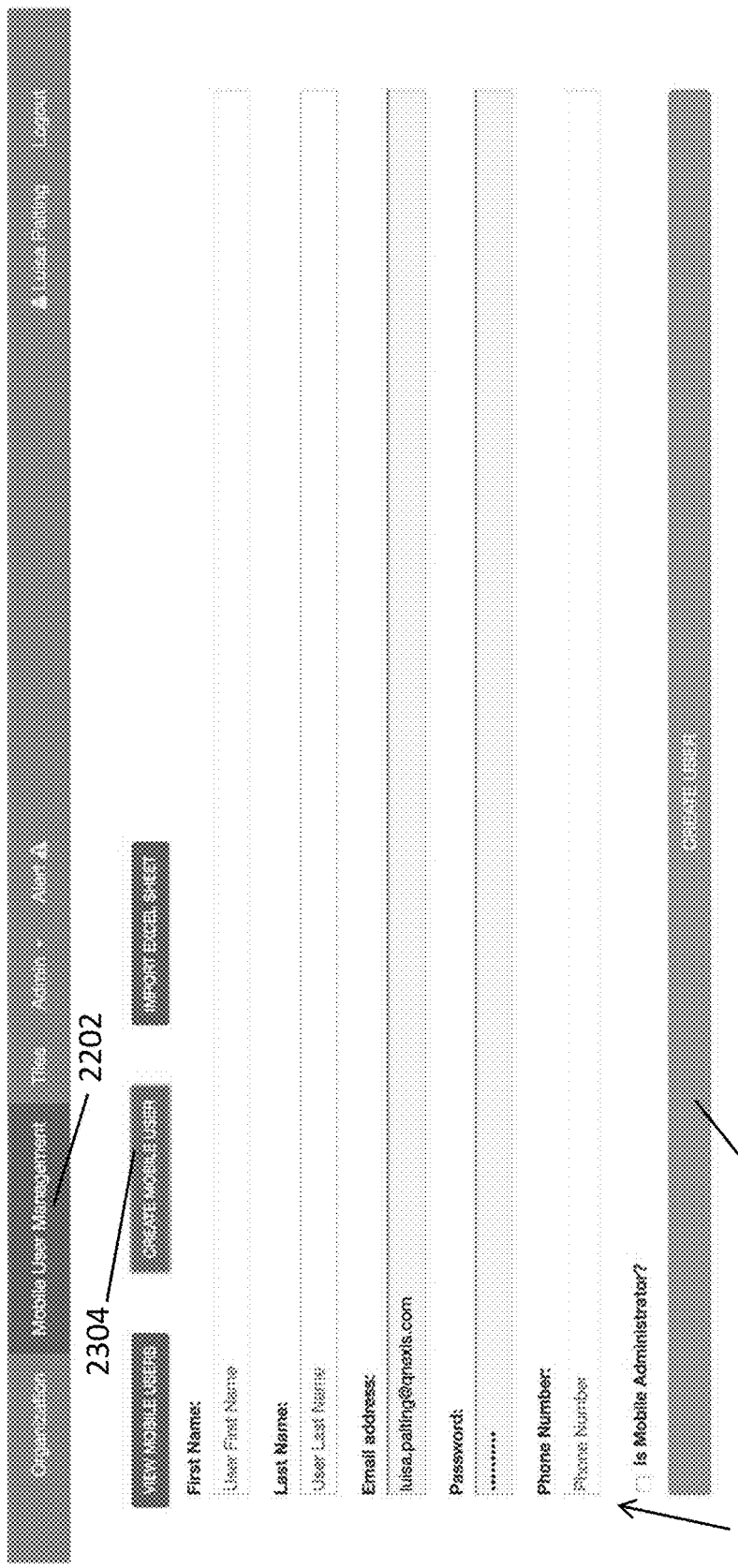
FIG. 23 shows a create mobile users web page of an organizational emergency management web application, in accordance with one or more implementations of the present invention.

FIG. 23 shows a create mobile users web page of an organizational emergency management web application, in accordance with one or more implementations of the present invention. An admin may navigate to the mobile user management selection 2202 on the top navigation bar and select create mobile user option 2304. Here, users may be added to the organizational system manually by inputting information into fields 2306 in a web form and selecting create user 2308.

Figure 24:
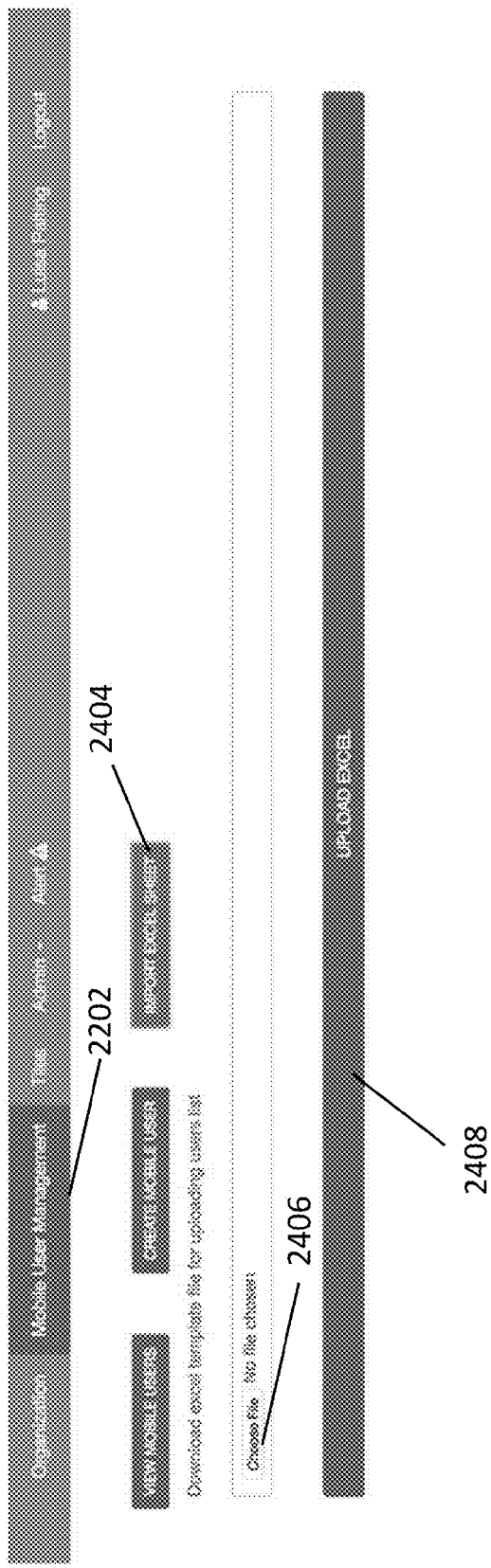
FIG. 24 shows an import user list web page of an organizational emergency management web application, in accordance with one or more implementations of the present invention.

FIG. 24 shows an import user list web page of an organizational emergency management web application, in accordance with one or more implementations of the present invention. An admin may navigate to the mobile user management selection 2202 on the top navigation bar and select import excel sheet 2404. From here, an admin user can select choose file 2406 to find a list of users to add automatically to the organizational system. Such a list may for example contain information pertaining to the users to be added that is the same as, similar to, or inclusive of the information filled into the fields in FIG. 23.

Figure 25:
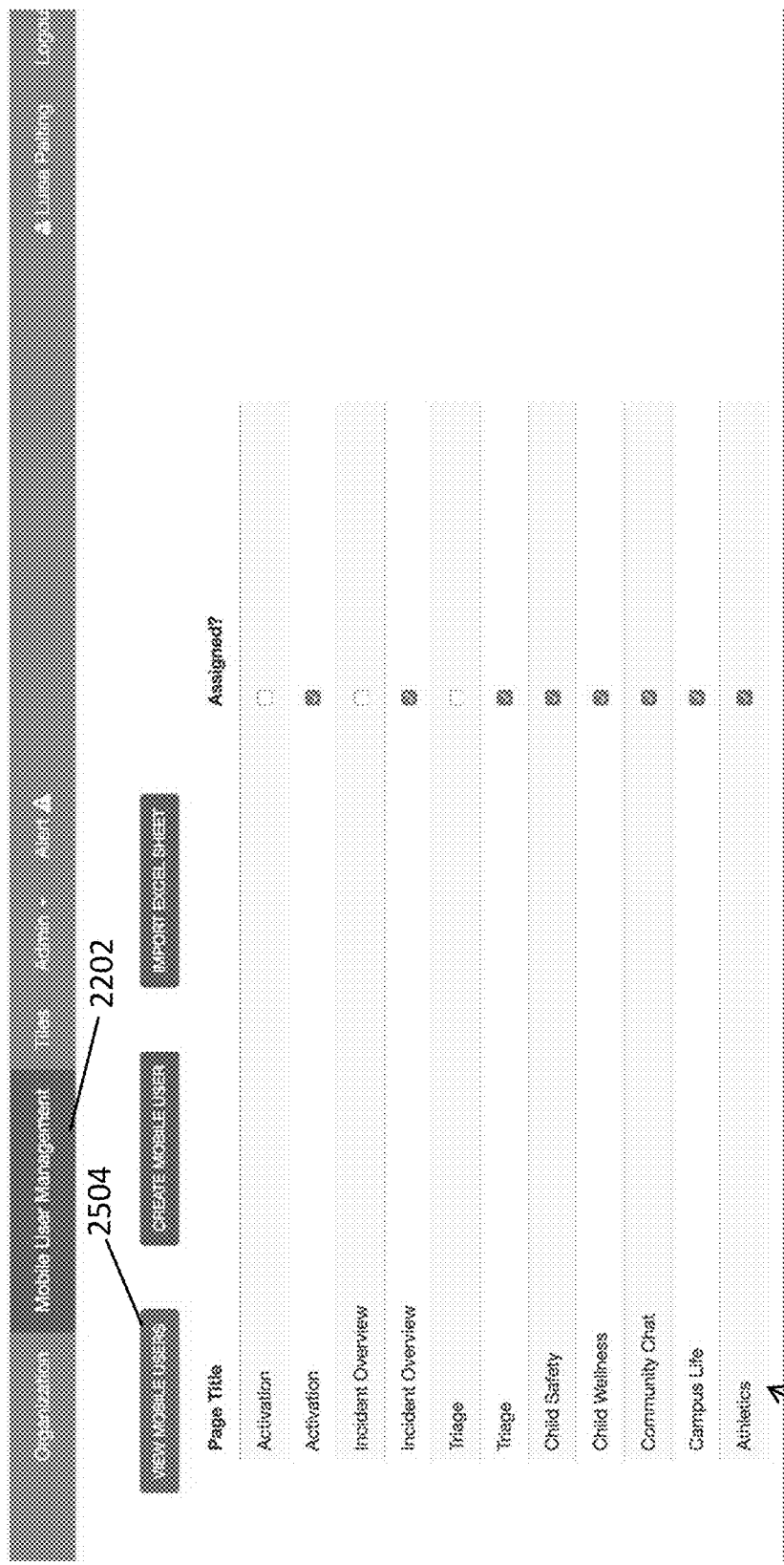
FIG. 25 shows a tile access management web page of an organizational emergency management web application, in accordance with one or more implementations of the present invention. what happens when you click on the gear icon under options in Managing User Roles view

FIG. 25 shows a tile access management web page of an organizational emergency management web application, in accordance with one or more implementations of the present invention. An admin may navigate to this web page by selecting a gear icon 2208 on the web page of FIG. 22. Here, information 2506 is displayed relating to the tiles to which the corresponding user has access to. Tile assignments can be managed from this page.

In some embodiments, the invention may be implemented as an enterprise mobile app designed to deliver digital communications and provide for emergency communications, enabling organizations or communities to keep members connected and informed via mobile phones. Unlike traditional email, websites, or digital signage, the app combines these capabilities to deliver mass communication on a mobile platform, featuring an emergency communications platform that allows administrators/first responders to alert members to emergency conditions such as inclement weather, fire, public safety hazards or threats. The app is useful to governments, corporations, colleges and universities and other enterprises that need to provide mass communications. In the event of an emergency, organizations need the ability to quickly communicate what is happening and determine everyone's status.

Using the app, the administrator can send alerts to members, pinpoint their location using e.g. Google® Maps, and request their status. A dashboard displays how many people reported their status and who has not responded. In addition, the administrator can contact members directly via email, phone or chat. The app provides unified communications for organizations to help people connect, share ideas and do their jobs better.

In an implementation, after downloading the app, a user opens the app and is presented with two options: a) Member and b) Administrator, for the user's selection. Based on the user's selection, the user is presented with input fields that correspond to the selection the user made. The user fills in the required information and presses a button to get validated. The user information is sent to the cloud, which cross checks the user's data against the organization's data and, if the information is valid, the user is granted access to the rest of the mobile app.

Once the user has been successfully validated, he/she is presented with a simple menu with the following choices: 1) Communication functionality, 2) Tracking functionality, 3) Accountability functionality. For communication functionality, the user has the choice of a) Emergency information and instructions—In the case of an emergency, a notification shows up alerting everyone that some type of an emergency is in progress and also sending real time updates to all registered users via push notifications, email and text message or b) Digital communication—Non-emergency news and announcements can be sent out via push notification. For tracking functionality, the user has the choice of a) Live tracking (For families only) and Interactive map that allows the family member where to locate their family member in the event of an emergency. For accountability functionality, a) In the case of an emergency, a notification shows up alerting everyone that some type of an emergency is in progress. b) A member would be asked to verify that he/she is OK or not OK. c) A Family member would be shown a split view. This screen would show a map and location of their family member on the bottom and the status of their family member on the top and communication information. d) Administrators would be shown dashboard of who has checked in and who has not checked in, with options for i) Dashboard graphic of number of people status, ii) Directory view of users, iii) Select individual users to view user profile—including First name, Last name, Cell phone—An administrator can call, text or send push notifications and geo locate, iv) Sort view by status (ok, not ok, no response, all), and v) Configuration: Upload organization logo, etc. e) Social functionality includes i) Ability to link to other members and track, ii) Family members can search and send a request to link to members, iii) Family members receiving the request can accept or deny. f) Multiple alerts from multiple organizations—Parents may have more than 1 student in different schools. G) Favorite—Ability for administrator to search and favorite users. In an emergency, the administrator may want to have a presorted list of users he/she wants to communicate with.

Each of the processes, methods, and algorithms described in the preceding sections may be embodied in, and fully or partially automated by, code instructions executed by one or more computer systems or computer processors comprising computer hardware. The processes and algorithms may be implemented partially or wholly in application-specific circuitry.

Any process descriptions, elements, or units in the diagrams described herein and/or depicted in the attached figures should be understood as potentially representing units, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

The invention is not limited to the particular embodiments illustrated in the drawings and described above in detail. Those skilled in the art will recognize that other arrangements could be devised. The invention encompasses every possible combination of the various features of each embodiment or implementation disclosed. One or more of the elements described herein with respect to various embodiments can be implemented in a more separated or integrated manner than explicitly described, or even removed or rendered as inoperable in certain cases, as is useful in accordance with a particular application. While the invention has been described with reference to specific illustrative embodiments, modifications and variations of the invention may be constructed without departing from the spirit and scope of the invention as set forth in the following claims.

I claim:

1. An emergency response system, comprising:
a first set of one or more computing devices programmed, via executable code instructions, to:
broadcast a first emergency alert to a second set of one or more recipient computing devices, responsive to instructions received from one or more of a third set of administrative or responder computing devices, the first emergency alert comprising information relating to an emergency and a response request, the response request permitting a user of each of the second set of one or more recipient computing devices to provide a binary positive or negative user status response;
receive binary positive or negative user status responses from the second set of recipient computing devices, and/or location information corresponding to each of the second set of recipient computing devices;
send a map showing known recipient computing device locations for the second set of recipient computing devices, coded by corresponding response status of positive, negative, or no response received, to the third set of administrative or responder computing devices;
broadcast a second emergency alert to each of a fourth set of one or more relationship computing devices, the second emergency alert comprising the information relating to the emergency and information pertaining to an associated user of one or more of the second set of one or more recipient computing devices including the associated user's status response or lack thereof, location information, and/or contact information;
send follow-up communications and/or queries to users of the second set of one or more recipient computing devices from which no status response and/or negative status responses were received;
utilize the received location information to identify positive status users of the second set of one or more recipient devices from which positive status responses were received who are located closest to users of the second set of one or more recipient computing devices from which no status response and/or negative status responses were received and querying them as to the status and/or location of the users of the second set of one or more recipient computing devices from which no status response and/or negative status responses were received;
send and receive social media messages between the recipient computing devices and override the exchange of social media messages to broadcast the first emergency alert regardless of how the recipient computing devices are currently being utilized, and to restore normal sending and receiving of social media messages only when an indication is broadcast that the emergency is over;
receive chat messages from the recipient computing devices, the administrator or responder computing devices, and/or the relationship computing devices and broadcast the chat messages to the recipient computing devices, the administrator or responder computing devices, and/or the relationship computing devices while the exchange of social media messages is overridden; and link two or more users of the recipient computing devices, the administrator or responder computing devices, and/or the relationship computing devices, such that the linked users have shared access to social media messages associated with given topics;

wherein sending and receiving social media messages comprises receiving messages from the recipient computing devices and broadcasting the messages to the recipient computing devices, the administrator or responder computing devices, and/or the relationship computing devices, and receiving responses from the recipient computing devices, the administrator or responder computing devices, and/or the relationship computing devices to the messages and broadcasting the responses to the recipient computing devices, the administrator or responder computing devices, and/or the relationship computing devices.

2. The system of claim 1, further comprising the second set of one or more recipient computing devices, wherein each of the one or more recipient computing devices of the second set is programmed, via executable code instructions, to:

receive the first emergency alert;

display the response request, responsive to receiving the first emergency alert, such that the user thereof can provide a binary positive or negative user status response by a single actuation; and transmit location information for the respective computing device and any user status response.

3. The system of claim 1, wherein the computing devices are further programmed, via executable code instructions, to provide summary statistics including number of recipient computing devices located within a given predetermined geographical area and/or number of recipient computing devices located within the given predetermined geographical area that have associated a negative user status response or no user status response.

4. The system of claim 3, wherein the predetermined geographical area comprises a building, a property, a campus, an area including a building, property, and/or campus and a certain surrounding area, and/or a given predetermined radius around a point.

5. The system of claim 3, wherein the summary statistics include number and/or percentage of number of recipient computing devices from which a response has been received and a list of recipient computing devices from which a response has not been received, wherein the administrative or responder computing devices are further programmed, via executable code instructions, to receive a selection of one or more recipient computing devices from the list and display further information regarding the selected one or more recipient computing devices and/or their users and to initiate an email, chat message, or phone call to the selected one or more recipient computing devices and/or their users.

6. The system of claim 1, wherein the computing devices are further programmed, via executable code instructions, to broadcast additional information pertaining to the first emergency alert to the second set of one or more recipient computing devices.

7. The system of claim 1, wherein the computing devices are further programmed, via executable code instructions, to receive updates to the binary positive or negative user status responses from the second set of recipient computing devices, and/or updates to the location information corresponding to each of the second set of recipient computing devices, and to update the displayed map accordingly.

8. The system of claim 1, wherein the computing devices are further programmed, via executable code instructions, to receive a selected subset of the second set of one or more recipient computing devices from a user of one of the third set of one or more administrator or responder computing devices and to query the subset as to the status and/or location of one or more of the users of the second set of one or more recipient computing devices from which no status response and/or negative status responses were received.

9. The system of claim 1, wherein the computing devices are further programmed, via executable code instructions, to receive one or more selected modes of transmission from a user of one of the third set of one or more administrator or responder computing devices and to broadcast the first and/or second emergency alert in the selected modes, the selected modes comprising one or more of email, SMS, and push notification.

10. The system of claim 1, wherein the responder computing devices are further programmed, via executable code instructions, to receive an instruction to suppress the response request from a user of one of the third set of one or more administrator or responder computing devices and to broadcast a third emergency alert to the second set of one or more recipient computing devices, the third emergency alert comprising information relating to a second emergency and not comprising a response request.

11. The system of claim 1, wherein the recipient computing devices are further programmed, via executable code instructions, to vibrate, play a special ringtone or sound, and/or display graphical elements when the first emergency alert is broadcast and the exchange of social media messages is overridden, to indicate an extraordinary nature of the first emergency alert.

12. The system of claim 1, further comprising an organizational data repository comprising identity information regarding members of an organization, wherein the computing devices are further programmed, via executable code instructions, to receive requests from unregistered computing devices to register as recipient computing devices associated with recipient users, the requests including associated identity information, and to check the identity information associated with the requests against the identity information in the organizational data repository regarding the members of the organization, and approving the request where a match is found.

13. The system of claim 1, wherein the computing devices are further programmed, via executable code instructions, to receive a non-emergency message from one of the administrative or responder computing devices and broadcast it to the recipient computing devices by email, SMS, and/or application push notification.

14. The system of claim 1, wherein the computing devices are further programmed, via executable code instructions, to receive requests to associate new relationship computing devices with the recipient computing devices, and to carry out or deny the received requests.

15. The system of claim 1, further comprising the third set of one or more administrative or responder computing devices, wherein each of the one or more administrative or responder computing devices of the third set is programmed, via executable code instructions, to: retrieve and display a directory of the second set of recipient computing devices and/or their users, to sort the directory by user status response, to display information for individual computing devices and/or users from the directory based on selections received from a user thereof, and to create temporary subsets of the second set of recipient computing devices based on received selections and transmit communications to all members of the temporary subsets simultaneously.

16. The system of claim 1, wherein the computing devices are further programmed, via executable code instructions, responsive to requests from the third set of administrative or responder computing devices, to transmit contact information corresponding to selected recipient computing devices to the requesting administrative or responder computing devices.

17. The system of claim 1, wherein the computing devices are further programmed, via executable code instructions, to track content of messages passing between recipient computing devices and to determine the types of content that are most frequently exchanged.

18. Non-transitory computer storage comprising instructions for causing a first set of one or more computing devices to determine, triage, follow-up and assist organizational members in an emergency by:
- broadcasting a first emergency alert to a second set of one or more recipient computing devices, responsive to instructions received from one or more of a third set of administrative or responder computing devices, the first emergency alert comprising information relating to an emergency and a response request, the response request permitting a user of each of the second set of one or more recipient computing devices to provide a binary positive or negative user status response;
- receiving binary positive or negative user status responses from the second set of recipient computing devices, and/or location information corresponding to each of the second set of recipient computing devices;
- displaying a map showing known recipient computing device locations for the second set of recipient computing devices, coded by corresponding response status of positive, negative, or no response received, on the third set of administrative or responder computing devices;
- broadcasting a second emergency alert to each of a fourth set of one or more relationship computing devices, the second emergency alert comprising the information relating to the emergency and information pertaining to an associated user of one or more of the second set of one or more recipient computing devices including the associated user's status response or lack thereof, location information, and/or contact information;
- sending follow-up communications and/or queries to users of the second set of one or more recipient computing devices from which no status response and/or negative status responses were received; and
- utilizing the received location information to identify positive status users of the second set of one or more recipient devices from which positive status responses were received who are located closest to users of the second set of one or more recipient computing devices from which no status response and/or negative status responses were received and querying them as to the status and/or location of the users of the second set of one or more recipient computing devices from which no status response and/or negative status responses were received.

* * * * *